US012517855B2

(12) United States Patent
Gorni et al.

(10) Patent No.: US 12,517,855 B2
(45) Date of Patent: Jan. 6, 2026

(54) EVENT-DRIVEN READOUT SYSTEM WITH NON-PRIORITY ARBITRATION FOR MULTICHANNEL DATA SOURCES

(71) Applicant: Brookhaven Science Associates, LLC, Upton, NY (US)

(72) Inventors: Dominik Stanislaw Gorni, Carle Place, NY (US); Grzegorz W. Deptuch, Great Neck, NY (US); Sandeep Miryala, Austin, TX (US)

(73) Assignee: Brookhaven Science Associates, LLC, Upton, NY (US)

( * ) Notice: Subject to any disclaimer, the term of this patent is extended or adjusted under 35 U.S.C. 154(b) by 143 days.

(21) Appl. No.: 18/286,829

(22) PCT Filed: Mar. 31, 2022

(86) PCT No.: PCT/US2022/022707
§ 371 (c)(1),
(2) Date: Oct. 13, 2023

(87) PCT Pub. No.: WO2022/221068
PCT Pub. Date: Oct. 20, 2022

(65) Prior Publication Data
US 2024/0193116 A1 Jun. 13, 2024

Related U.S. Application Data

(60) Provisional application No. 63/244,692, filed on Sep. 15, 2021, provisional application No. 63/175,625, filed on Apr. 16, 2021.

(51) Int. Cl.
*G06F 13/40* (2006.01)
(52) U.S. Cl.
CPC .............................. *G06F 13/4031* (2013.01)

(58) Field of Classification Search
CPC ..... G06F 13/37; G06F 13/4031; G06F 13/364
See application file for complete search history.

(56) References Cited

U.S. PATENT DOCUMENTS 5,301,333 A * 4/1994 Lee ..................... G06F 13/364
710/244
6,487,213 B1 * 11/2002 Chao ..................... H04L 49/20
370/428

(Continued)

FOREIGN PATENT DOCUMENTS

KR 100606701 B1 7/2006
KR 1020090118610 A 11/2009

OTHER PUBLICATIONS

Deptuch, "Large Analysis of RStrobe and RStrobe-less Solution VIPIC 1—First Brief Look", URL: https://lss.fnal.gov/archive/test-tm/2000/fermilab-tm-2709-ppd.pdf, 2019.

(Continued)

*Primary Examiner* — Phong H Dang
(74) *Attorney, Agent, or Firm* — Dorene Price

(57) ABSTRACT

An event-driven readout management system includes non-priority access arbitration of a plurality of channels. The system includes an arbitration tree circuit, response circuit, in-channel logic circuit, and output periphery circuit. The arbitration tree circuit determines to which of the plurality of channels to grant access to a common signal transfer resource shared by the plurality of channels based on a readout access request provided by at least one of the plurality of channels. The arbitration tree circuit terminates a prior readout transaction and commences a subsequent readout transaction in response to a single edge of a clock signal. The in-channel logic circuit terminates the prior readout transaction and commences the subsequent readout transaction in response to receiving an acknowledge token. The output periphery circuit converts information received (Continued)

from the plurality of channels into an output format on the common signal transfer resource.

19 Claims, 35 Drawing Sheets

(56) References Cited

U.S. PATENT DOCUMENTS

| | | | |
|---|---|---|---|
| 8,271,700 | B1 | 9/2012 | Annem et al. |
| 8,498,941 | B2 | 7/2013 | Felsher |
| 8,869,150 | B2 | 10/2014 | Sundararaman et al. |
| 10,352,991 | B2 | 7/2019 | Fahim et al. |
| 11,889,208 | B2 * | 1/2024 | Segura Puchades .. H04N 25/44 |
| 11,929,940 | B1 * | 3/2024 | Featherston .......... H04L 47/783 |
| 2004/0210696 | A1 * | 10/2004 | Meyer ..................... G06F 13/37 710/240 |
| 2005/0177633 | A1 | 8/2005 | Plunkett |
| 2005/0240707 | A1 * | 10/2005 | Hayashi ................ G06F 13/364 710/309 |
| 2006/0026330 | A1 | 2/2006 | Yi et al. |
| 2007/0053513 | A1 | 3/2007 | Hoffberg |
| 2012/0120468 | A1 * | 5/2012 | Binkert ............... H04J 14/0256 359/107 |
| 2019/0171488 | A1 | 6/2019 | Howe et al. |
| 2021/0002683 | A1 | 1/2021 | Talagala et al. |

OTHER PUBLICATIONS

Shapiro et al., "Progress on the Design of a Data Push Architecture for an Array of Optimized Time Tagging Pixels", URL: https://www.slac.stanford.edu/pubs/slacpubs/6000/slac-pub-6249.pdf, 1993.

Mani et al., "An Asynchronous Data Acquisition Asic With a Data Push Architecture", Nuclear Instruments and Methods in Physics Research, vol. 360, pp. 345-348, 1995.

Lin et al., "ASIC Implementation of a Data Push Architecture for Silicon Pixel Readout", 1994 Meeting of the American Physical Society, Division of Particles and Fields (DPF 94), 1994.

Deptuch et al., "Vertically Integrated Pixel Readout Chip for High Energy Physics", Government Microcircuit Applications & Critical Technology Conference—GomacTech 11, 2011.

Deptuch et al., "A Vertically Integrated Pixel Readout Device for the Vertex Detector at the International Linear Collider", IEEE Transactions on Nuclear Science, vol. 57, pp. 880-890, 2010.

Yang et al., "Low-Power Priority Address-Encoder and Reset-Decoder Data-Driven Readout for Monolithic Active Pixel Sensors for Tracker System", Nuclear Instruments and Methods in Physics Research Section A: Accelerators, Spectrometers, Detectors and Associated Equipment, vol. 785, pp. 61-69, 2015.

Yang et al., "AMonolithic Active Pixel Sensor Prototype for the CEPC Vertex Detector", Nuclear Instruments and Methods in Physics Research Section A: Accelerators, Spectrometers, Detectors and Associated Equipment, vol. 924, pp. 82-86, 2019.

Lee et al., "A Low Power Priority Encoding Technique with Address-Encoder and Reset-Decoder for an Improved Hierarchical Asynchronous Detector", 2018 15th International Conference on Synthesis, Modeling, Analysis and Simulation Methods and Applications to Circuit Design (SMACD), 2018.

Deptuch et al., "Design and Tests of the Vertically Integrated Photon Imaging Chip", IEEE Transactions on Nuclear Science, pp. 663-674, 2014.

Georgiou et al., "High-Speed, Address-Encoding Arbiter Architecture", Electronics Letters, vol. 42, pp. 170-171, vol. 3, 2006.

Rovere et al., "Design of a QDI Asynchronous AER Serializer/Deserializer Link in 180nm for Event-Based Sensors for Robotic Applications", 2015 IEEE International Symposium on Circuits and Systems (ISCAS), 2015.

Liu et al., "Event-Based Neuromorphic Systems", URL: https://onlinelibrary.wiley.com/doi/pdf/10.1002/9781118927601.fmatter, Chapter 2, pp. 9-36, 2015.

Fahim et al., "A Low-Power, High-Speed Readout for Pixel Detectors Based on an Arbitration Tree", IEEE Transactions on Very Large-Scale Integration (VLSI) Systems, vol. 28, pp. 576-584, 2020.

Turko et al., "An Asynchronous Fixed Priority Arbiter for High Throughput Time Correlated Single Photon Counting Systems", 2018 25th IEEE International Conference on Electronics, Circuits and Systems (ICECS), Bordeaux, France, 2018, pp. 765-768, doi: 10.1109/ICECS.2018.8618023, URL: 10.1109/ICECS.2018.8618023, pp. 765-768, 2018.

International Search Report and Written Opinion received for PCT Application No. PCT/US2022/022707, dated Jul. 12, 2022, 10 pages.

European Search Report received for PCT Application No. PCT/US2022/022707, dated Jan. 28, 2025, 9 pages.

Boahen, K., "A Throughput-On-Demand Address-Event Transmitter for Neuromorphic Chips," Proceedings 20th Anniversary Conference on Advanced Research in VLSI, IEEE, Georgia, USA, Mar. 21-24, 1999 pp. 72-86, 15 pages.

Niclass, C., et al., "A CMOS 64×48 Single Photon Avalanche Diode Array with Event-Driven Readout," 2006 Proceedings of the 32nd European Solid-State Circuits Conference, Montreaux, Switzerland (2006) pp. 556-559.

Ara Shawkat, M. S., et al., "A Cmos Perimeter Gated SPAD Based Digital Silicon Photomultiplier with Asynchronous AER Readout for PET Applications," IEEE Biomedical Circuits and Systems Conference (BioCAS), Cleveland, OH, USA, (2018) pp. 1-4.

Thu Linn, A. M., et al., "Adaptive priority toggle asynchronous tree arbiter for AER-based image sensor," IEEE/IFIP 19th International Conference on VLSI and System-on-Chip, Hong Kong, China (2011) pp. 66-71.

\* cited by examiner

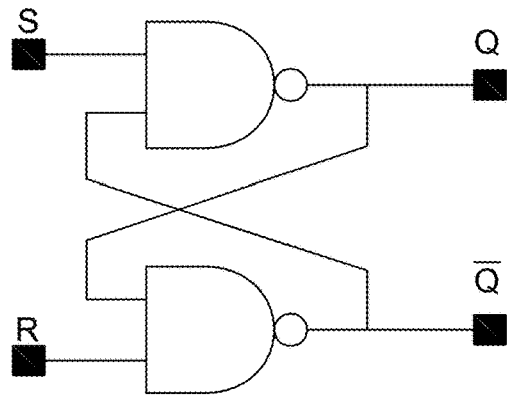
FIG. 20A
| S | R | $Q_{next}$ | $\overline{Q}_{next}$ | Comment |
|---|---|---|---|---|
| 0 | 0 | 1 | 1 | Idle |
| 0 | 1 | 1 | 0 | Reset |
| 1 | 0 | 0 | 1 | Set |
| 1 | 1 | Q | $\overline{Q}$ | Hold |
FIG. 20B
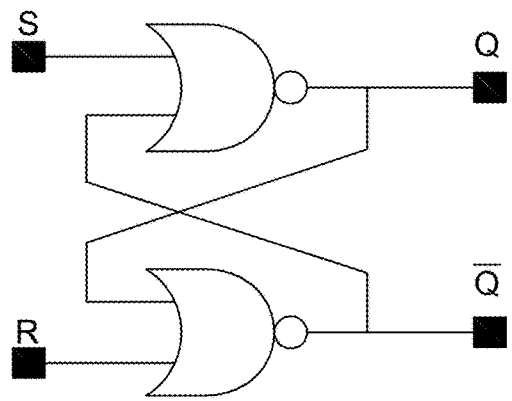
FIG. 21A
| S | R | $Q_{next}$ | $\overline{Q}_{next}$ | Comment |
|---|---|---|---|---|
| 0 | 0 | Q | $\overline{Q}$ | Hold |
| 0 | 1 | 1 | 0 | Set |
| 1 | 0 | 0 | 1 | Reset |
| 1 | 1 | 0 | 0 | Idle |
FIG. 21B

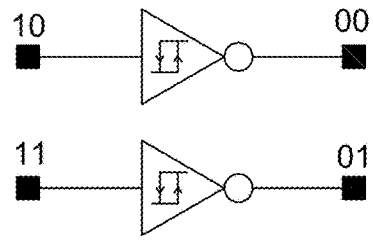
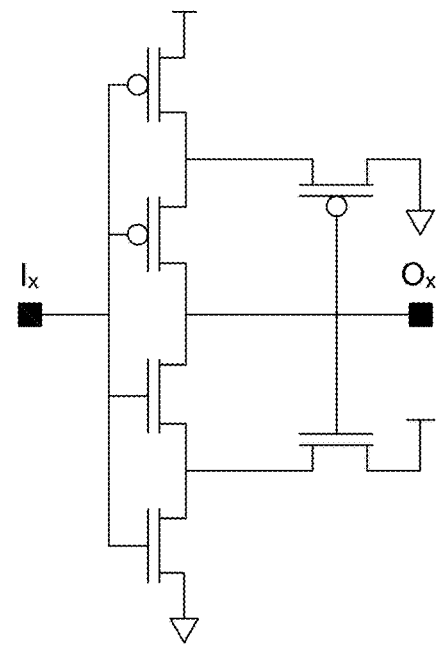
FIG. 23C  FIG. 23D
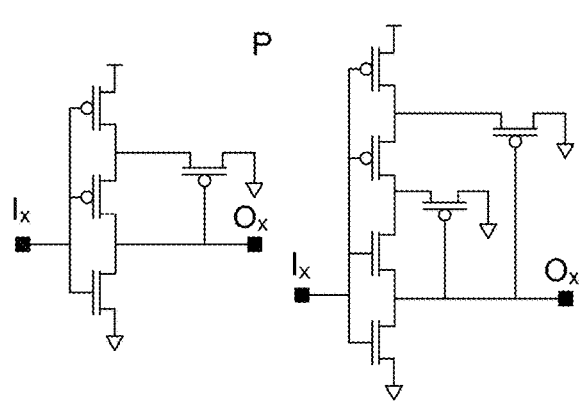
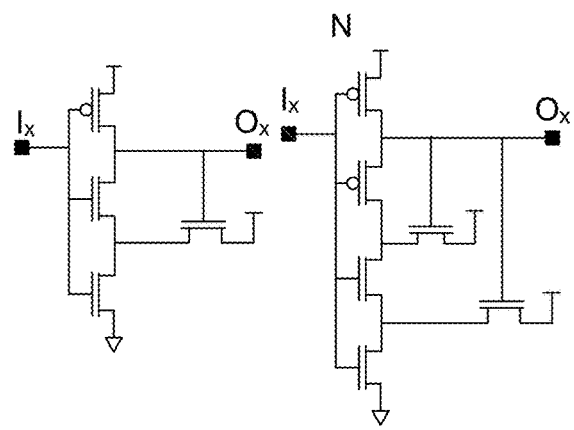
FIG. 23E  FIG. 23F

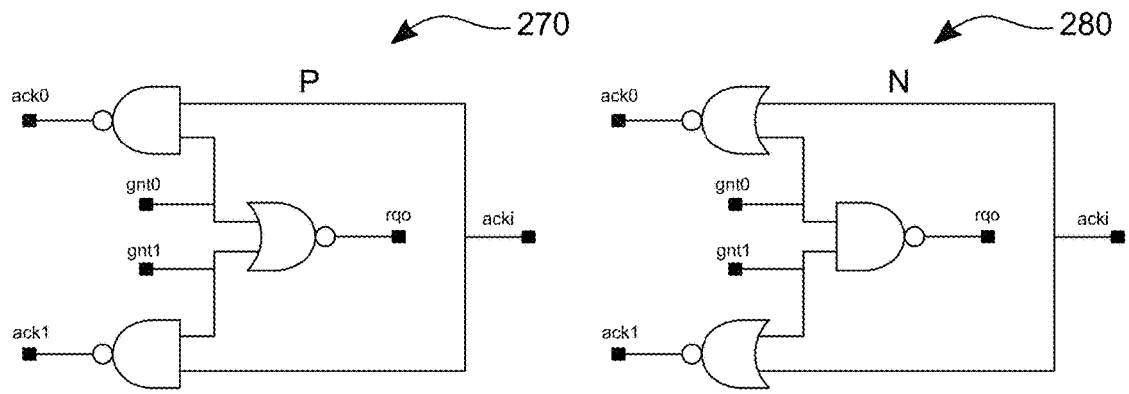
FIG. 24A
FIG. 24C
| gnt[1:0] | rqo | ack1 | ack0 |
|---|---|---|---|
| 00 | 1 | 1 | 1 |
| 01 | 0 | 1 | $\overline{ack1}$ |
| 10 | 0 | $\overline{ack1}$ | 1 |
| 11 | 0 | $\overline{ack1}$ | $\overline{ack1}$ |
272
| gnt[1:0] | rqo | ack1 | ack0 |
|---|---|---|---|
| 00 | 0 | $\overline{ack1}$ | $\overline{ack1}$ |
| 01 | 0 | $\overline{ack1}$ | 0 |
| 10 | 0 | 0 | $\overline{ack1}$ |
| 11 | 1 | 0 | 0 |
282
FIG. 24B
FIG. 24D
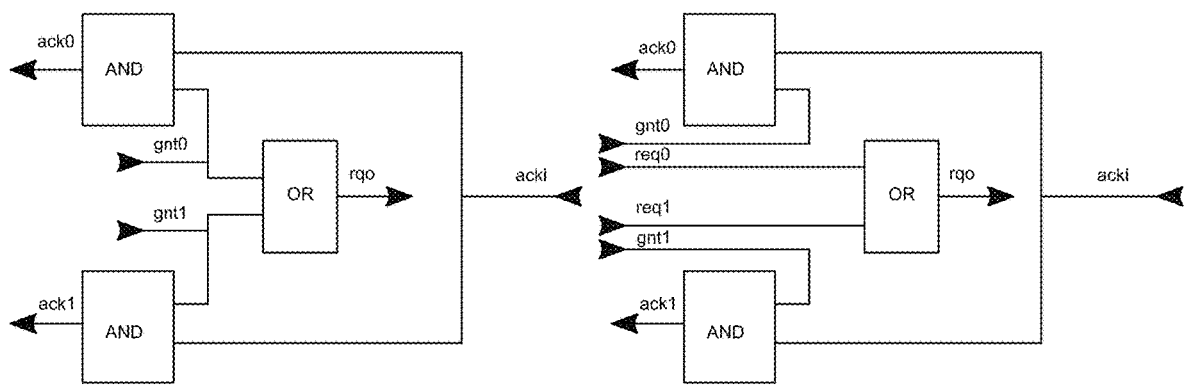
FIG. 24E
FIG. 24F

EVENT-DRIVEN READOUT SYSTEM WITH NON-PRIORITY ARBITRATION FOR MULTICHANNEL DATA SOURCES

CROSS-REFERENCE TO RELATED APPLICATIONS

This application is a National Phase application of International Application No. PCT/US2022/022707, filed Mar. 31, 2022, which claims the benefit of and priority to U.S. Provisional Application No. 63/175,625, filed Apr. 16, 2021, and U.S. Provisional Application No. 63/244,692, filed Sep. 15, 2021, the disclosures of which are incorporated herein by reference in their entireties.

STATEMENT OF GOVERNMENT LICENSE RIGHTS

This invention was made with Government support under contract number DE-SC0012704 awarded by the U.S. Department of Energy. The present invention was made with Government support under NASA grant NNX16AC42G awarded by the National Aeronautics and Space Administration. The United States government may have certain rights in this invention.

BACKGROUND

The disclosed embodiments generally relate to an event-driven readout system with non-priority arbitration for multichannel data sources.

SUMMARY

The disclosed embodiments relate to an event-driven readout management system including non-priority access arbitration of a plurality of channels. The system includes an arbitration tree circuit, response circuit, in-channel logic circuit, and output periphery circuit. The arbitration tree circuit determines to which of the plurality of channels to grant access to a common signal transfer resource shared by the plurality of channels based on a readout access request provided by at least one of the plurality of channels. The arbitration tree circuit excludes simultaneous occurrence of multiple readout access requests from the determination, and the readout access request is stored in the arbitration tree circuit until access is granted to the common signal transfer resource by the arbitration tree circuit. The arbitration tree circuit terminates a prior readout transaction and commences a subsequent readout transaction in response to a single edge of a clock signal. The response circuit is operatively coupled to the arbitration tree circuit, and a state of the clock signal represents an acknowledge token. The acknowledge token is provided to the arbitration tree circuit, which uses the acknowledge token to grant access to the common signal transfer resource. The in-channel logic circuit is operatively coupled to the arbitration tree circuit, and generates the readout access request and receives the acknowledge token. The in-channel logic circuit terminates the prior readout transaction and commences the subsequent readout transaction in response to receiving the acknowledge token. The output periphery circuit converts information received from the plurality of channels into an output format on the common signal transfer resource.

The common signal transfer resource may include at least one of an analog signal transfer line and a digital signal transfer line, and the readout access request may be generated in response to an event, wherein the event may include activation of at least one of the plurality of channels to generate transferrable data. The readout transaction may include a plurality of readout phases, and at least one of the plurality of readout phases may cause transfer of at least a portion of information from one of the plurality of channels to the common signal transfer resource. A duty cycle associated with the clock signal may be selectable to maximize settling time associated with the common signal transfer resource, and the determination may include determining which of a plurality of readout phases associated with the readout transaction is assigned to the plurality of channels independent of at least one of readout access requests stored in the arbitration tree circuit, readout access requests received, and a relative position of the plurality of channels with respect to the arbitration tree circuit. A quantity of edges associated with the clock signal may be equal to a quantity of readout phases associated with the readout transaction, and the arbitration tree circuit may operate asynchronously with the plurality of channels. The arbitration tree circuit may operate synchronously with the output periphery circuit, may operate synchronously with the in-channel logic circuit, and the in-channel logic circuit may operate asynchronously in generating the read access request using the acknowledge token such that a duration of the acknowledge token defines an acceptance time window associated with the read access request.

A duty cycle of the acknowledge token signal may be selectable to extend a minimum readout phase time. The plurality of channels may provide information to the common signal transfer resource such that a transmission order associated with concurrently requesting channels is independent of arbitration tree positions associated with the concurrently requesting channels. The readout request output in each stage of arbitration tree may represent a logical sum of request signals from a stage lower in the arbitration tree or a logical sum of the result signals from arbitration between requests or internal signals of the single arbitration cell, in the case when the arbitration cell is performing arbitration not only between the readout requests but also between the readout requests and the state of the acknowledge line. Thus, the acknowledge token is prevented from being blocked even if there are still active readout access requests when the read out is terminated.

The disclosed embodiments further relate to a method of non-priority arbitration of a plurality of channels using an event-driven readout management system. The method includes determining, using an arbitration tree circuit, to which of the plurality of channels to grant access to a common signal transfer resource shared by the plurality of channels, wherein the determination is based on a readout access request provided by at least one of the plurality of channels; excluding, using the arbitration tree circuit, simultaneous occurrence of multiple readout access requests from the determination; storing the readout access request in the arbitration tree circuit until access is granted to the common signal transfer resource by the arbitration tree circuit; terminating, using the arbitration tree circuit, a prior readout transaction and commencing a subsequent readout transaction in response to a single edge of a clock signal; providing an acknowledge token to the arbitration tree circuit, wherein the arbitration tree circuit uses the acknowledge token to grant access to the common signal transfer resource, and wherein a state of the clock signal represents the acknowledge token; generating, using an in-channel logic circuit, the readout access request and receiving the acknowledge token, wherein the in-channel logic circuit is operatively coupled to the arbitration tree circuit; terminating, using the in-channel logic circuit, the prior readout transaction and commencing the subsequent readout transaction in response to receiving the acknowledge token; and converting, using an output periphery circuit, information received from the plurality of channels into an output format on the common signal transfer resource.

The disclosed embodiments yet further relate to a computer-readable medium including instructions that, when executed by a processing device, perform operations including: determining, using an arbitration tree circuit, to which of the plurality of channels to grant access to a common signal transfer resource shared by the plurality of channels, wherein the determination is based on a readout access request provided by at least one of the plurality of channels; excluding, using the arbitration tree circuit, simultaneous occurrence of multiple readout access requests from the determination; storing the readout access request in the arbitration tree circuit until access is granted to the common signal transfer resource by the arbitration tree circuit; terminating, using the arbitration tree circuit, a prior readout transaction and commencing a subsequent readout transaction in response to a single edge of a clock signal; providing an acknowledge token to the arbitration tree circuit, wherein the arbitration tree circuit uses the acknowledge token to grant access to the common signal transfer resource, and wherein a state of the clock signal represents the acknowledge token; generating, using an in-channel logic circuit, the readout access request and receiving the acknowledge token, wherein the in-channel logic circuit is operatively coupled to the arbitration tree circuit; terminating, using the in-channel logic circuit, the prior readout transaction and commencing the subsequent readout transaction in response to receiving the acknowledge token; and converting, using an output periphery circuit, information received from the plurality of channels into an output format on the common signal transfer resource.

Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein:

FIGS. 20A-B show an SR latch with NAND gates and its truth table;

FIGS. 21A-B show an SR latch with NOR gates and its truth table;

FIGS. 23C-D show metastable filters implemented using inverters with hysteresis;

FIGS. 23E-F show metastable filters implemented using inverters with feedback;

FIGS. 24A-F show embodiments of a commutator and truth tables;

Figure 1:
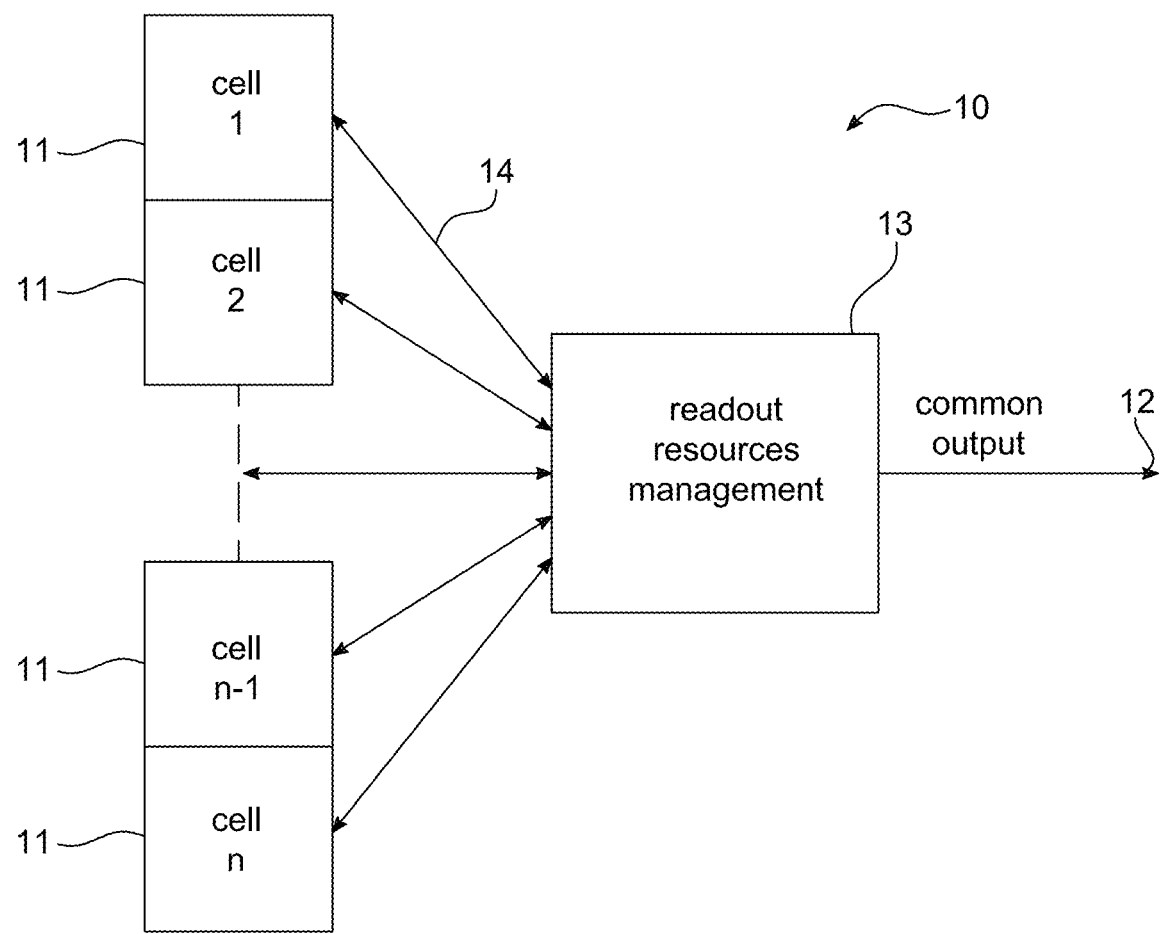
FIG. 1 shows a readout resources management system with multiple sources of data requesting readouts asynchronously, in which a common output bandwidth is significantly smaller than a total bandwidth of channels during simultaneous channel submissions.

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

Data readout and computer network systems that either collect or transmit data strive for optimal usage of available bandwidth associated with links. One category of data transmission includes links that are permanently configured to assure data streaming rates, which translates into substantial reductions in latency and data loss at the cost of reserving the link even when data is not being transferred. Another category includes links configured upon receiving transmission requests from sources of data or the sources of data determine whether to occupy bandwidth of a link after probing channel occupancy and constating that the link is not used by another concurring source. The latter risks false detection of an idle state associated with the data link due to finite channel propagation speed. This may occur when two or more distant sources initiate transmission after detecting that a channel is empty. However, transmissions from other channels may still not reach distant sources to allow detection by these distant sources of a busy state. To handle such situations without losing transmitted data, collision detecting mechanisms are incorporated in the network systems, such as that used in 10BASE5 and 10BASE2 Ethernet standards in accordance with IEEE 802.3. Solving the problem of transmission medium access by ordering a source to send requests for transmission to a switch or data concentrator and to receive access acknowledgements utilizes a handshaking protocol. Execution of such a protocol introduces latency, and thus inefficiency in the readout system. Setting up private links to sources of data or establishing handshaking protocols are costly and often require non-optimal allocation of bandwidth, additional hardware, and increased latency.

Addressing how to collect data efficiently from spatially distributed sources poses similar challenges regardless of whether it concerns a distributed grid associated with in-field deployed sensors, computers on a network, cells in content addressable memories, channels in neuromorphic chips, or elements in one-dimensional (line) or two-dimensional (pixelated) radiation detectors. These facilities or instruments typically share a common feature of concurrently reporting data by two or more sources of data, which may be seen as asynchronous with respect to clocking associated with a receiver. Although synchronizing sources of data using data concentration is possible by distributing a common time base, achieving this goal comes at a greater cost. Additional links for distributing a clock signal results in greater power dissipation. In particular, the clock is widely distributed regardless of how sparse data is transmitted since idle time between consecutive data transmission events are present.

As shown in FIG. 1, an efficient readout system 10 is disclosed for collecting sparse data originating from multiple sources or channels 11, in which the channels 11 operate asynchronously. Each channel 11 optimally provides data to a central data acquisition system 13 in such a way that the order of channels 11 that transmit concurrently is independent of their geographical positions. The protocol and hardware architecture are developed for Application Specific Integrated Circuits (ASICs) that are used, for example, to read out one-dimensional or two-dimensional multichannel radiation sensors, which are implemented using, for example, micro-strip or pixelated radiation sensors.

The readout system 10 provides an alternative to a token-passing scheme, but does not exhibit deficiencies of that scheme, such as a deterministic order of read out channels and a varied delay in accessing these channels as a function of the location of channels at a beginning or end of a token passing route. The readout system 10 ensures that there are no collisions and that no channel is starved for the allocation of time slots to transmit data. That is, there is no situation in which an access to the readout resources is unfairly or perpetually denied to one or more of the channels. A characteristic feature of this readout system 10 is that the common output bandwidth 12 of the data link is significantly less than the total data bandwidths 14 of all channels 11 when transmitting simultaneously.

Generally, readout resource management architectures are classified in the following categories.

Figure 2A:
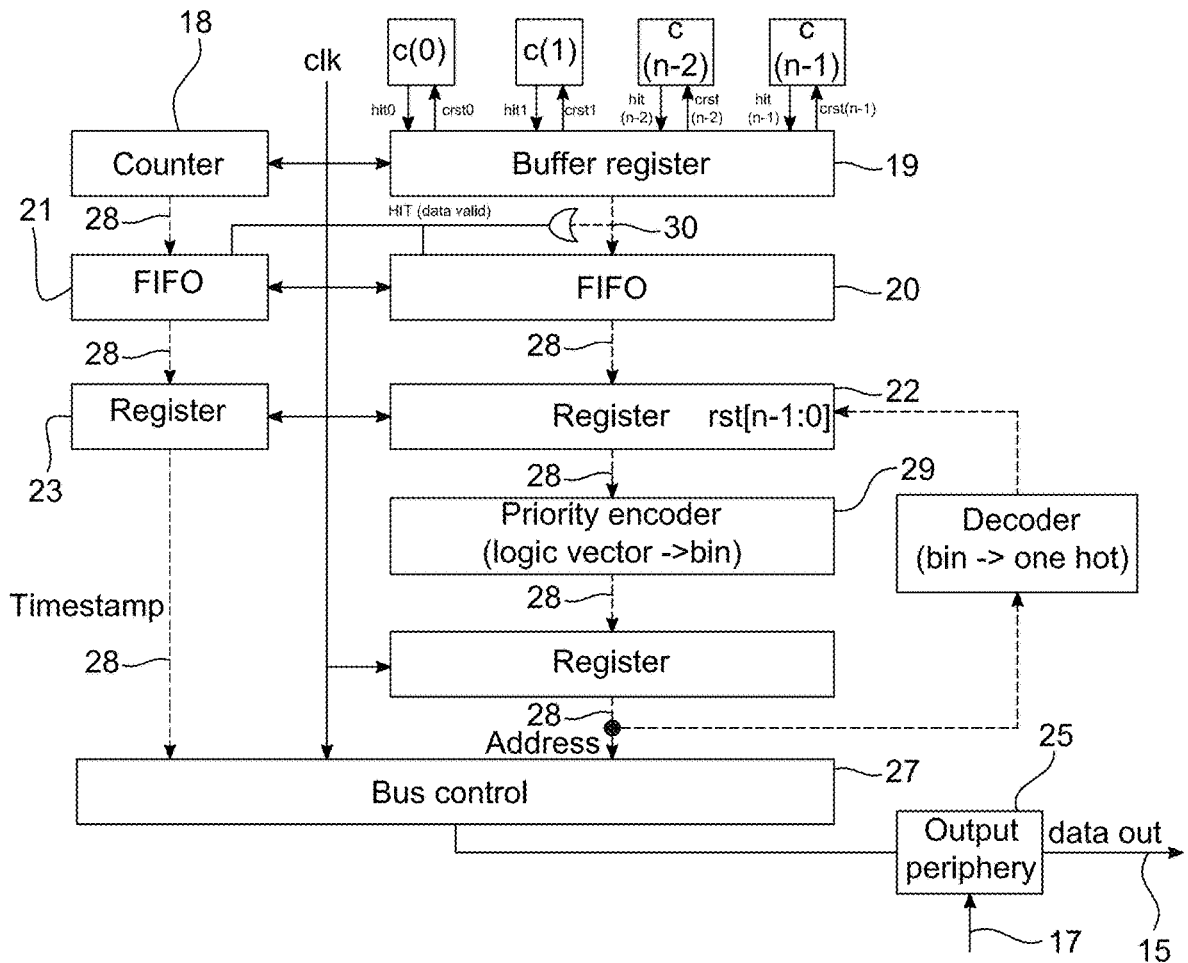
FIG. 2A shows a block diagram of data-push architecture.
Figure 2B:
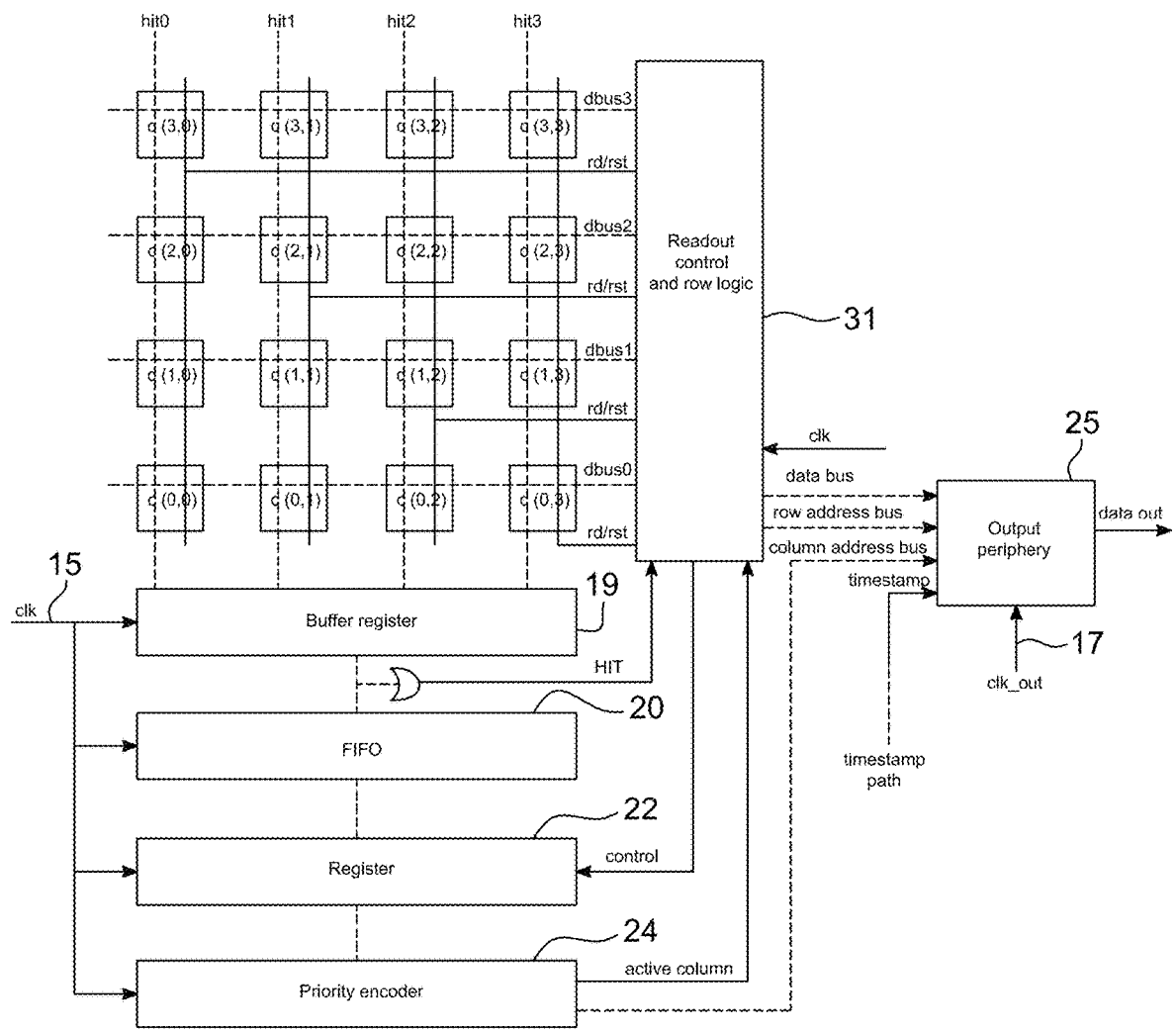
FIG. 2B shows a block diagram of two-dimensional data-push architecture.

(1) Data-Push Architecture (DPA) is a data driven architecture that initiates readout cycles of valid data from a channel without receiving an external trigger. DPA can be found, inter alia, in simple multi-channel application, such as that shown in FIG. 2A. DPA receives asynchronous data, records a time-of-arrival, and sequences the data on a common bus. These operations take place as follows: after an event, such as deposition of a particle, a high logic state is set on a hit line corresponding to the channel in which the event occurred. This information is then sent to a buffer 19 for storage. The buffer 19 generates a channel reset (crst) signal that resets an analog circuit inside the channel so that the analog circuit is ready to detect a new event. Information from the buffer 19 is strobed into a FIFO 20 by a system clock and subsequent operations are thereafter synchronous as represented by lines 28, whereas asynchronous data lines are represented by line 30. A counter 18 value, which is interpreted as a timestamp of the event, is strobed into its own FIFO 21 simultaneously. FIFOs 20, 21 reduce dead time, during which a channel does not detect new events because the channel is processing a previous event, while reducing the probability of losing data. The oldest information from the FIFO 21 is provided to a register 23. This data is referred to as a current processed event and can include information regarding multiple events if these events occur with the same timestamp. To handle multiple events, priority encoder, decoder, and single bit reset functions in the register 23 are used. The first of these functions finds an active bit in a logic vector, stores the active bit in the register 23, and converts a position of the most significant active bit to a binary value. This value is then latched to an additional register (not shown). From that register, the value is transmitted, together with the timestamp, to the output periphery 25 by a bus control 27. From there the value is sent out to an external system. Output from the register 23 is also decoded to one hot code, which is a binary vector with an active bit in one position. Such a representation of the address is used to clear a bit in the register 23 so that the next hit address can be encoded and sent out. If there are no more active bits, subsequent data is obtained from the FIFO 21. Synchronization with the system clock 17 occurs inside the buffer register 19 or FIFOs 20, 21. The DPA can suffer from metastable states, which result in invalid logic levels due to asynchronous data from a channel changing near an edge of the system clock 17. This can result in invalid timestamp assignment and/or data loss. FIG. 2B illustrates implementation of the DPA with a two-dimensional input array that provides data to a readout control and row logic block 31. A practical advantage of DPA is that it does not require continuous distribution of a clock to the channels. However, DPA may exhibit the following disadvantages:

(a) pipeline stages, such as buffers, FIFOs, and registers introduce delays in outputting data;
(b) metastable states caused by triggering synchronous readout and latching synchronous data (e.g., time stamps) using asynchronous hit signals;
(c) readout is not fully data-driven for two-dimensional arrays since channels with valid hit signals are found after columns are selected; and
(d) if multiple events occur, the events are processed using a fixed priority that favors some cells over other cells.

Figure 3:
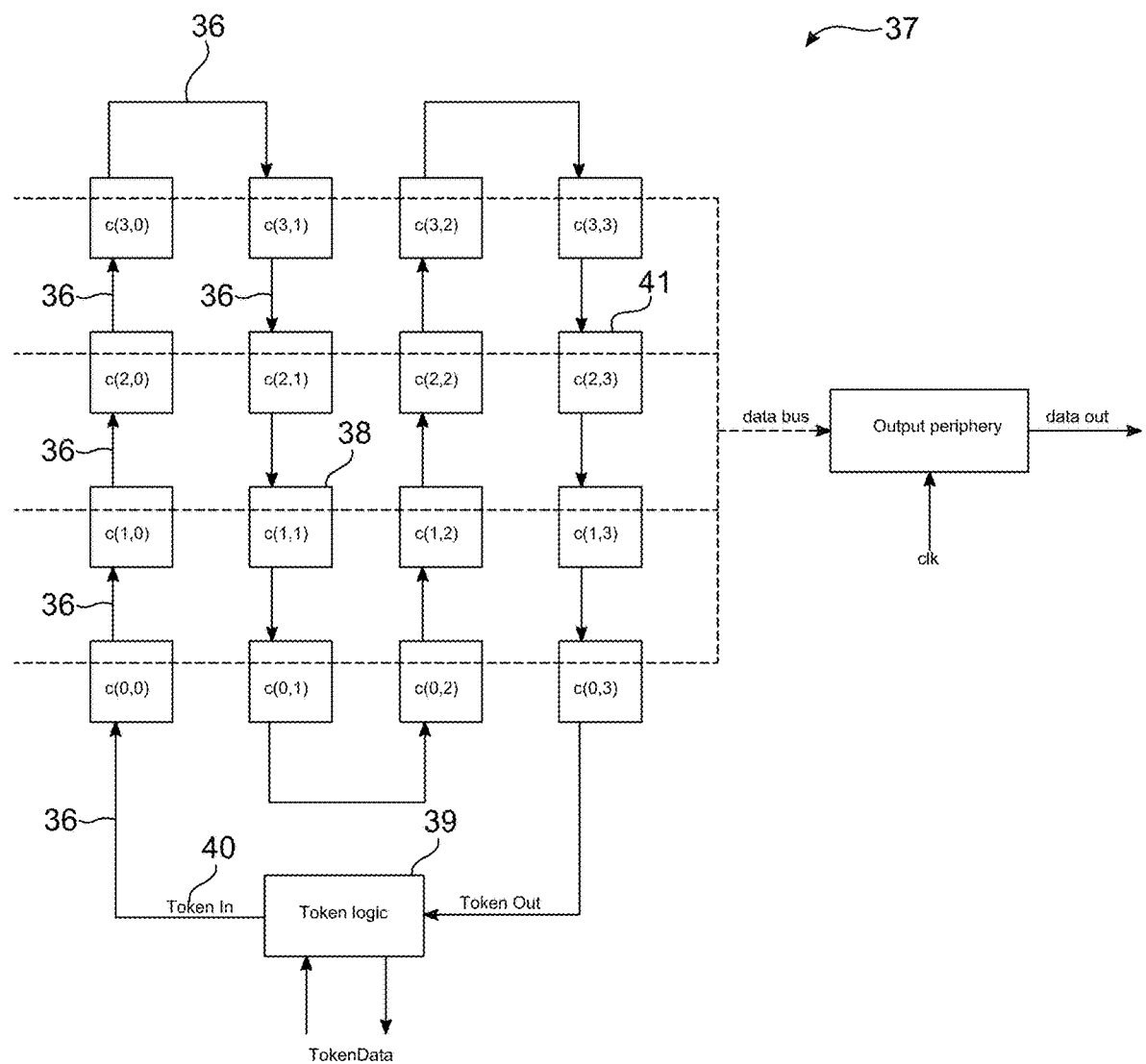
FIG. 3 shows a block diagram of token ring architecture.

(2) Token Ring Architecture (TRA) 37 is a readout polling architecture, as shown in FIG. 3. A token is injected into a chain of channels and transferred from one cell to another cell until a cell containing valid data is reached. The cell with valid data retains the token for a sufficient amount of time to output data. After readout of this cell is completed, the cell releases the token to propagate further, as shown in FIG. 3. Signals 36 show a path of the token until the token finds a cell with valid data 38. Readout is then initiated and another cell with valid data 41 waits for the next cycle. If the token originates in the token logic 39, the channels located farther from the source of tokens may experience a shortage of tokens during times of high event intensity. Alternatively, if a token is transferred from a channel after readout of that channel, additional strobing is transmitted to all channels in the ring. Thus, the length of the chain is important as this length determines how much of the total readout time slot is available for data settling since the token requires time to reach its destination. This travel time can be short or long. If the chain is too long, there is a risk of timing failure. An additional clock that strobes advancement of the token to successive cells can be distributed across channels. However, presence of the additional clock increases power consumption. In addition, the allocation of time to cover the travel time of the token to the farthest cell in the chain and settling time for the data results in suboptimal use of link bandwidth in this token passing readout architecture.

Figure 4A:
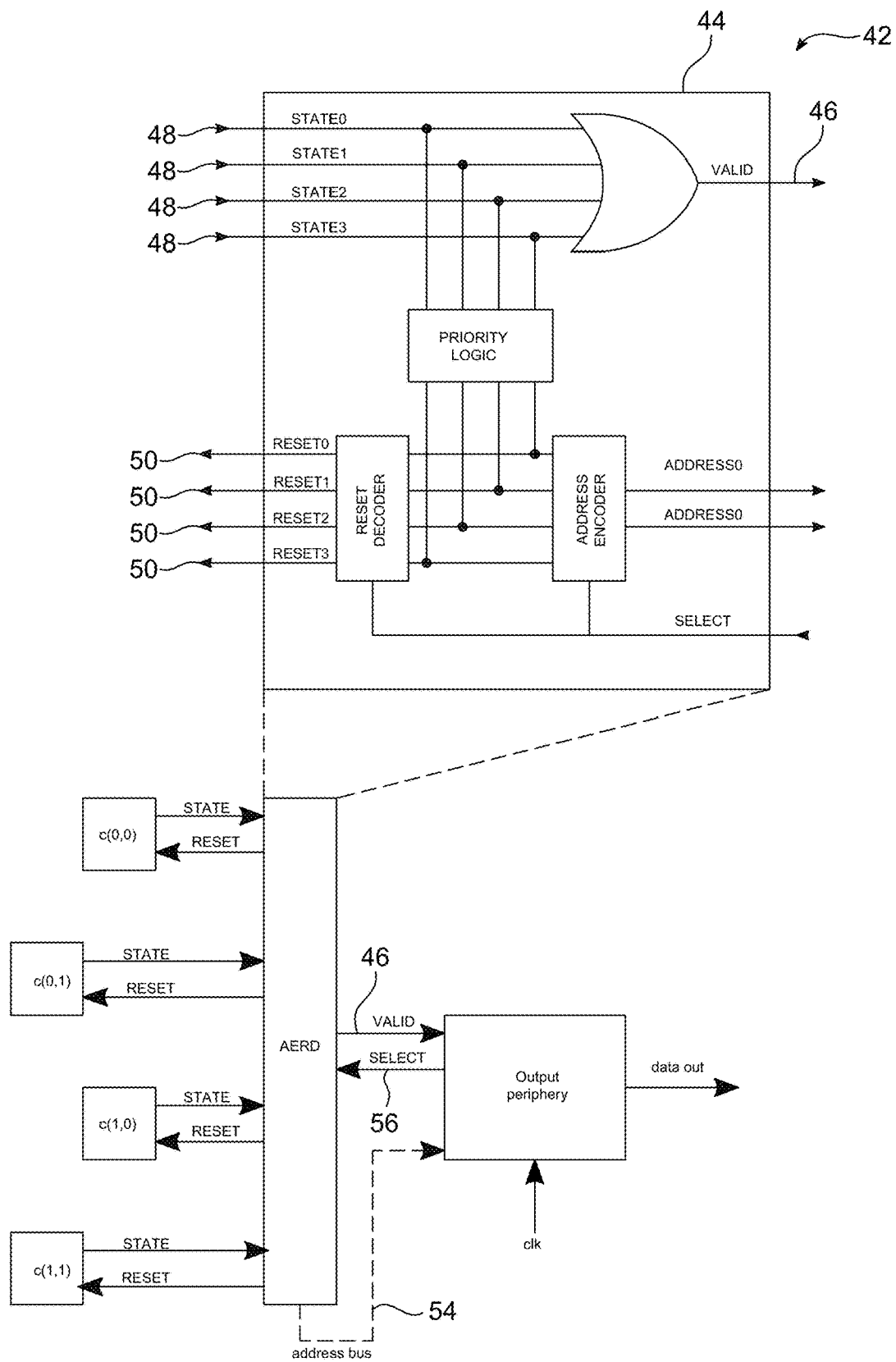
FIG. 4A shows a block diagram of a readout system with address-encoder and reset-decoder architecture.

(3) Address-Encoder and Reset-Decoder (AERD) 42 is a form of data driven readout architecture as shown in FIG. 4A. Reporting which channel includes data to be read out and switching to the next channel to report is achieved using an arbitration tree 44. The arbitration tree 44 is implemented using a cascade of blocks with substantially identical functions. Cascading is used to expand the quantity of arbitrated channels. There are two types of input to the arbitration tree 44. The first type of input includes channel STATE signals 48 that indicate data present in the channels or empty channels. The second type of input includes SELECT signals 56 on the data acquisition side that are decoded as a RESET 50 signal upon reaching the destination channel. The arbitration tree 44 encodes an address of the channel that is allowed to report during propagation of the STATE signals 48 until a VALID output signal 46 is obtained. The arbitration tree 44 also decodes channels that receive the RESET 50 signal during propagation of the SELECT signals 56 in the opposite direction, that is, from the acquisition side to the channel side. The SELECT signals 56 are generated synchronously using the clock signal if the VALID signal 46 is active. Priority encoders and reset decoders in each block of the arbitration tree 44 are used to select the channel having its address encoded and to what channel the reset signal is sent in the event of simultaneous notifications of channel occupancies and their readiness to report. When the SELECT signal 56 reaches a channel and the RESET 50 signal changes its state, a readout is initiated. Communication with a channel is terminated after the RESET 50 signal returns to its initial state. The STATE flag is then cleared and the address is no longer available on the address bus 54. Due to this double-edge scheme, dead time before switching to the next channel is possible, which reduces the available time for driving the bus. Timing in a AERD cell may result in unwanted glitches on more than one RESET input on the same edge of the SELECT signal, and thus data loss.

In a standard, data driven AERD embodiment, the corruption of data may occur if a higher priority channel requests readout while a lower priority channel is performing readout. In this case, an additional strobe signal, which is distributed across channels, is used to latch the state in all channels before readout begins. However, in implementing this feature, the architecture becomes synchronous rather than event driven.

Figure 4B:
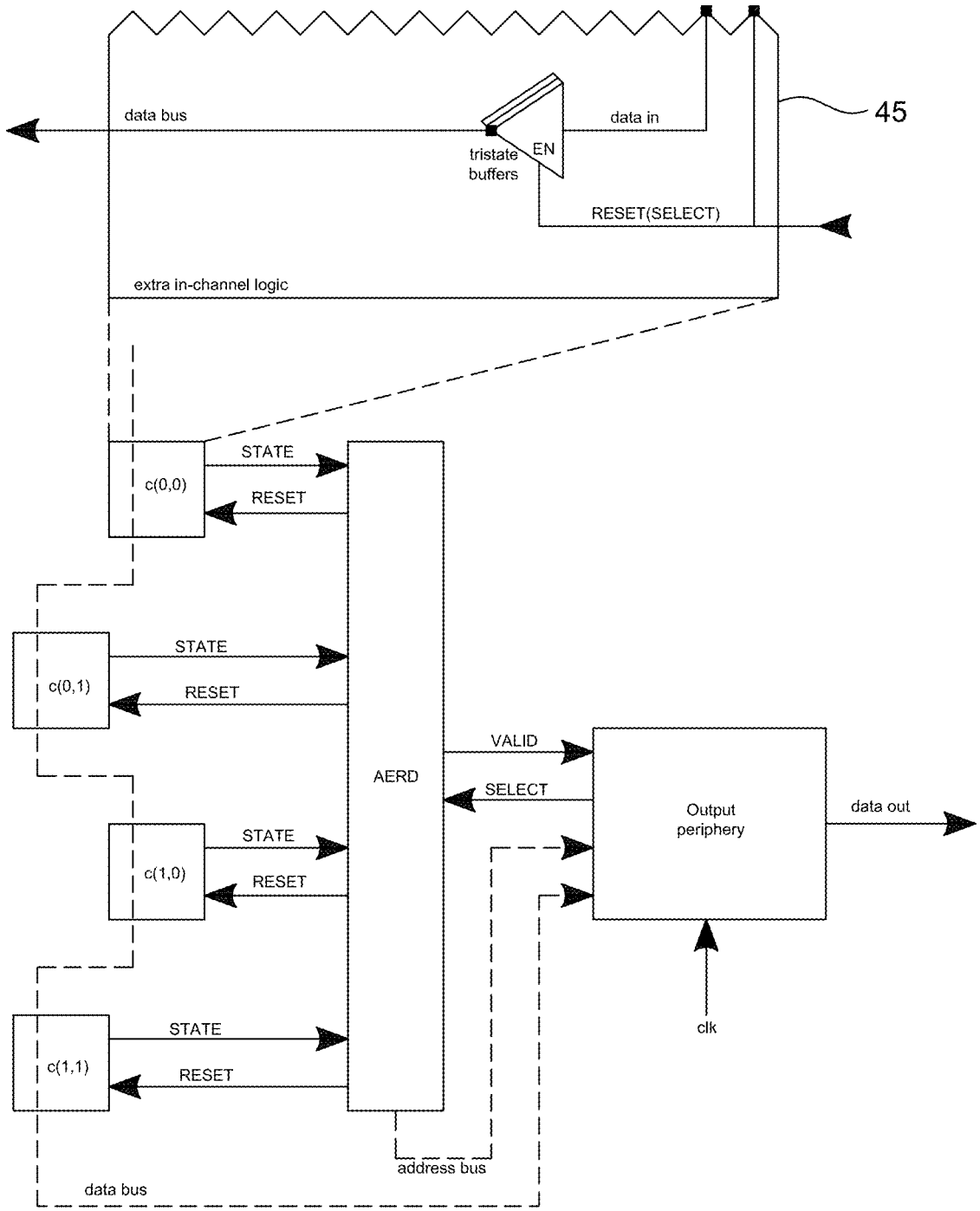
FIG. 4B shows a block diagram of a readout system with address-encoder and reset-decoder architecture and an additional data bus.

Adding extra in-channel logic 45 to the AERD system provides the ability to read additional data from channels as shown in FIG. 4B. This logic 45 drives the data bus in response to a change on the RESET signal. After the RESET signal returns to its initial state, buffers in the channel are disabled. Effectively, data on the data bus is available at the same time as an address on the address bus.

Figure 5:
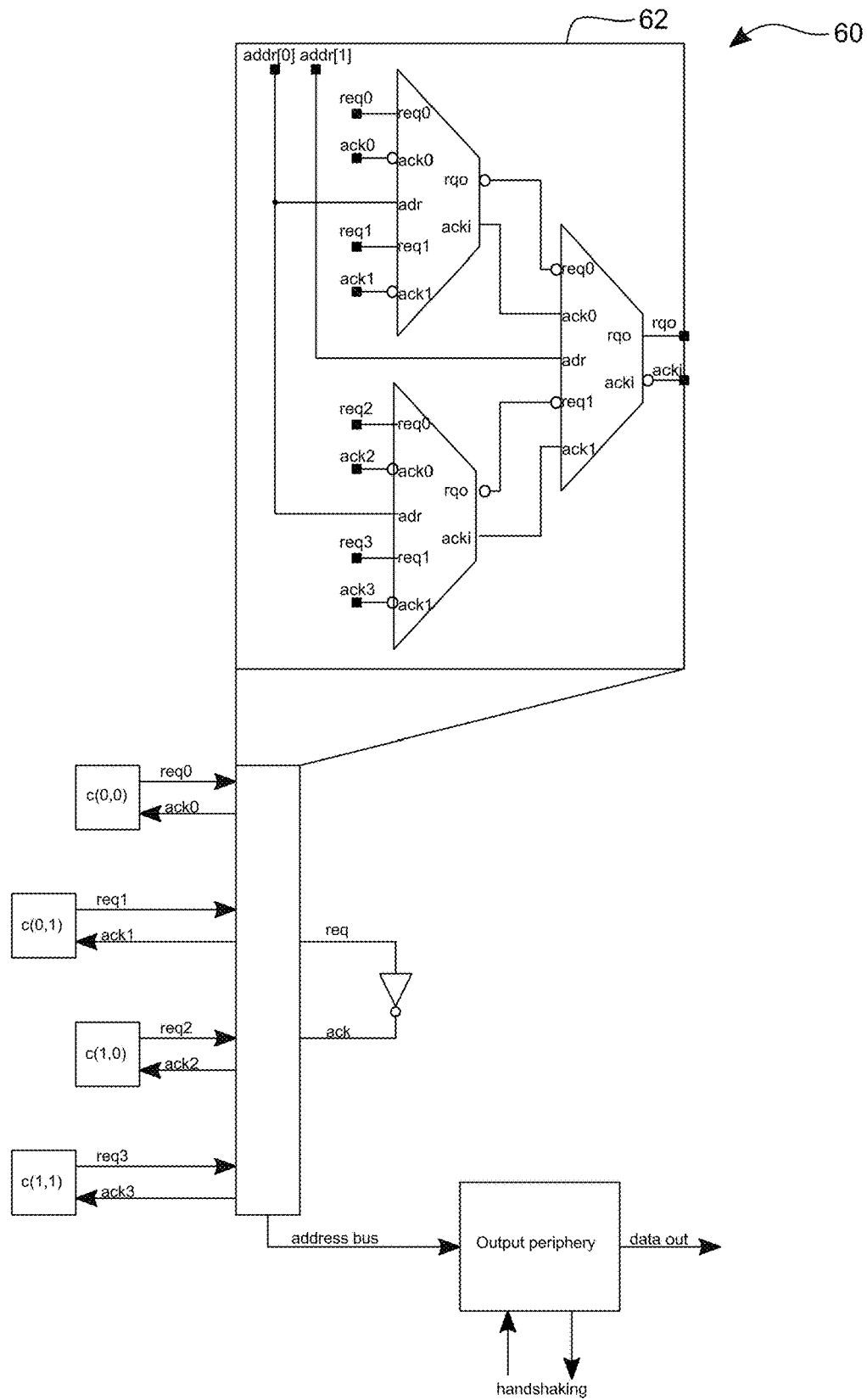
FIG. 5 shows a block diagram illustrating communication based on address event representation architecture.

(4) Address Event Representation (AER) 60 is a data-driven architecture based on an asynchronous arbitration tree 60 shown in FIG. 5. This architecture primarily focuses on cell activity represented as its address appearing on a data link. Each event inside a channel generates a request. In response to this request, an acknowledge is generated and an address of the requesting cell is transmitted. One of the distinguishing features of AER is that the acknowledge, which enables outputting of the data from a channel or its address, is generated automatically based on requests. Regardless of the number of channels requesting communication, only one of these channels is active at any given time to avoid collisions on the link. Communication with an external system is not synchronized by a clock and requires a handshaking interface. These features render AER suitable for only specific applications and limit the use of more universal acquisition systems.

Figure 6:
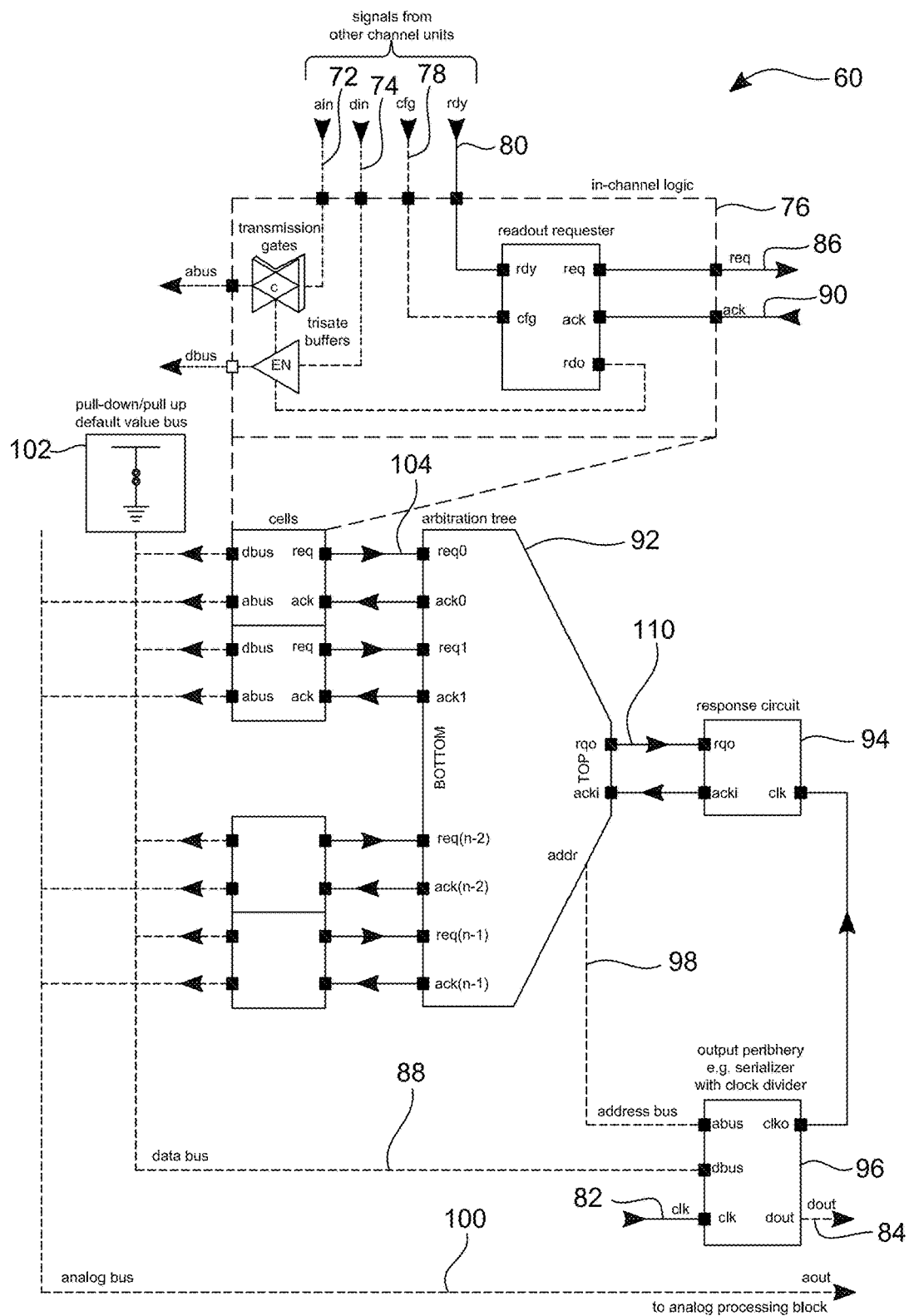
FIG. 6 shows a block diagram of an embodiment of a readout management system.

Embodiments of the readout system disclosed herein are adapted for the efficient transmission of data from a plurality of data sources, which can be arranged in one-dimensional structures, two-dimensional structures, and/or any other form. These embodiments possess improvements and features that are advantageous for the integrated readout of strip and pixel radiation detectors, as well as building neuromorphic or other event-driven processing circuits. These embodiments further enable sending additional data, beyond merely the active channel address, and providing a reliable mechanism that prevents the collision of channels accessing a common data bus. An interface to a synchronous data acquisition system is also provided. A block diagram of an embodiment of the readout system 70 is shown in FIG. 6. The readout system 70 can be used in a variety of applications with different units inside the channels. A universal interface to these functional units is provided to adapt to different sources and types of input data. The universal interface includes the following signals.

(1) ain 72 represents an analog input in the form of one or a plurality of connections to in-channel logic 76, which includes the result of processing from analog units of the channel;

(2) din 74 represents digital data input in the form of one or a plurality of connections to the in-channel logic 76 with signal inputs, which include the result of processing from digital units of the channel;

(3) cfg 78 represents configuration input in the form of one or a plurality of connections that specify a mode of operation of the in-channel logic 76; and (4) rdy 80 represents a ready flag, which is set after the channel units have finished processing the data, following which a read request is transmitted from the channel.

External sources of the clock (clk) 82 originate from acquisition systems or on-chip clock resources. Output signals include digital (dout) 84 and analog (aout) 100.

Functional blocks of the readout system 70 include the following.

(1) An in-channel readout logic 76 is present in every channel. The primary function of the in-channel logic 76 is to issue requests to signal when data from a channel requires a read out (e.g., when data is ready after in-channel processing). Readout can include any type of individual or combined analog or digital information generated by a channel, such as an address identifier of the read out channel, time-of-arrival of a signal, amplitude of a signal, and/or any other result of processing. Requesting the readout is achieved by activating a req signal 86. After the readout request is issued, the in-channel logic 76 waits for an acknowledge token the arrival of which indicates permission to use the data bus 88 has been granted. The acknowledge token is detectable by the in-channel logic 76 as a change on an ack line 90.

(2) An arbitration tree 92 determines to which channel the acknowledge token is directed. The interface to the in-channel logic 76 is located at the bottom of the tree. At the top of the tree, the rqo signal, which is a logical sum of all channel requests, is available. The acknowledge input acki is also located on the top of the tree. The arbitration tree 92 decision is made based on new read requests and stored information regarding the order in which these requests have already arrived. Depending on the quantity of channels in the system and their grouping, the arbitration tree 92 may include multiple stages, each of which may be configured from multiple, two-input (for the readout request) arbitration cells. Each arbitration cell monitors its inputs and information concerning an origin of requests. Subsequent requests wait until a prior request has been withdrawn.

(3) A response circuit 94 generates the acki signal and feeds these acknowledges to the arbitration tree 92 for distribution to the channels that request to be read out. In the subject architecture, the acknowledge indicates that the logic state on the line changes from a default state, which is the state after reset, to an active state. The default state can be considered as a token with a fixed lifetime that depends on a duty cycle of the input clock clk. Delivery of the token to the channel triggers an action. However, token management is different from that in Token Ring Architecture. In TRA, the token is injected into the channel chain with a task of finding the first requesting channel. However, in the subject architecture, the token waits at the top of the arbitration tree 92 until a path to the channel is set by the arbitration tree 92. Then, the token is either distributed to the selected channel or, if no path is available during its lifetime, the token expires.

(4) An output periphery 96 is a synchronous block that converts input data from the data bus and address bus into an appropriate output format used by the chip interface and control blocks for communicating with an external acquisition system. The format can include a serial stream of bits. The data and address bus can be separate or can be configured as one bus, onto which data and/or addresses can be multiplexed.

(5) The data bus 88 is shared across a channel's digital line(s) driven in idle state by default using a pull-up/pull-down network. These lines are used for data transmission from a channel to the output periphery 96. After readout from the selected channel begins, tri-state buffers inside the channel override the data bus idle state set by the pull-up/pull-down network with data from the tri-state buffers.

(6) An analog bus 100 is shared across the channel line(s). The analog bus 100 is used for analog value transmission from channels to an analog processing block (not shown).

(7) The address bus 98 is shared across the channel digital line(s) using tristate buffers inside the arbitration tree 92, in which an address of the channel with an established acknowledge path is generated. Alternatively, addresses of current readout channels are formed and transmitted on the data bus directly from the channel selected for read out. It is to be noted that the address bus is optional.

(8) A pull-down/pull-up network 102 is used to set a default value on the data bus 88 when none of the tristate buffers driving the data bus during readout is active due to, for example, read requests not being issued by any channel or when a requesting channel waits for an acknowledge token. The network 102 is implemented using digital buffers or resistors connected between the bus line and one of the power lines. In both cases, buffers placed inside the channels are designed to override the logical state set by the network 102. To override this logic state, buffers with a greater drive strength are used.

The readout system 70 operates according to the following scheme.

(1) Channels operate independently and are generally not synchronized. If any of the channels requires use of a shared resource, that channel activates its ready signal. The readout request flag inside the in-channel logic is activated as a result. This operation can be completely asynchronous, which means that the readout request flag can be set to active at any moment regardless of the clock.

(2) The request is propagated up the arbitration tree 92 through multiple stages inside the arbitration tree 92 to the rqo output 110. During this process, the path for directing the acknowledge signal is established by logic inside each arbitration cell. If two readout requests reach the same arbitration cell, a path for the acknowledge signal is established for only one of the readout requests and this decision is based on the order of the readout request arrivals. This action is referred to as an arbitration process and is performed by a logic block containing a cell that is referred to as the "Seitz arbiter" in the arbitration cell. If this order is difficult to determine as a result of substantially simultaneous readout request signals, the arbitration decision may be delayed for an indefinite time. After arbitration is completed, the readout request is propagated to the next stage.

(3) Information regarding a source of the request 104 that prevailed in the arbitration processes is obtained from the arbitration tree 92 and is available to read on the address bus 98, if used. In the variant with no address bus, the address may be generated inside the channel and transferred on the data bus (4) In the meantime, a response circuit, which functions independently of the arbitration process, generates acknowledge tokens based on the clock signal clk 82. Tokens are synchronously available on the acknowledge input of the arbitration tree 92 and have a fixed duration. The time between tokens represents a minimum guarantying time for buffers in a channel to drive the data bus and transmit data to the output periphery 96.

(5) As soon as the readout request arrives at the top of the arbitration tree 92, the acknowledge path is complete and the token, if available, is distributed back to the requestor. If the token is not available, the arbitration tree 92 waits for generation of a new token.

(6) When the token arrives back at the cell, the readout process begins. Although every token has the same initial duration at the top of the arbitration tree 92, the duration of a single readout from a channel can vary. This results from how tokens are generated and how tokens are moved from one channel that ends its access to the bus to another channel that obtains access to the bus. This time is maximized when a path for a token is already established before an actual token is generated, and is minimized when a readout request comes late. In the latter case, propagation of the readout request through the arbitration tree 92 and setting up the acknowledge path essentially races with an expiration of the associated token. However, the cell readout logic is sensitive to an event (e.g., arrival of the token) rather than a logical level on the acknowledge line, and thus varying the duration of the token is not an issue.

(7) The in-channel logic 76 may be configured to handle at least one readout cycle in response to a single readout request. This process is referred to as the "readout phase" because it divides an entire readout into consecutive readout phases. In each readout phase, different data can be driven on the data bus. This allows a width of the bus to be reduced or reconfiguration of the bus to read out different data sets from the channel. The latter is accomplished by various configurations selected using configuration (cfg) bits. The configuration is dynamically selectable during operation.

(8) The readout signal (rdo) inside the in-channel logic 76 may be a single bit or multi-bit logic vector, which is used to distinguish which readout phase is active. One-hot encoding is used for this purpose, which means that only one bit of the rdo logic vector is active at a time. The first bit of rdo is set upon arrival of the first token after the request has been issued. This bit is then used to enable a bank of tristate buffers and/or transmission gate banks. As an alternative to using banks of gates, a multiplexor can be added to select between data to be sent onto previously activated gates. The next set of data is sent with the next rdo bit set. In this way, during each readout phase, different data can be transmitted from the channel.

(9) The acknowledge path to the channel is not detached until the last readout phase ends because the readout request is held during this time. As a result, each newly generated token is immediately still fed to the same channel. A new readout phase is initiated after each token arrives. After the last phase is processed, a subsequent token initiates a reset procedure for the in-channel logic and the request flag is cleared. This process disconnects the path for the acknowledge.

(10) A new path is established as soon as all necessary arbitrations are performed if there are any pending requests from other channels. The token that was previously used to reset the in-channel logic 76 of the channel, if that token is still valid, can be reused and sent to the new channel. This feature advantageously prevents wasting time between read outs from different channels.

(11) The pull-up/pull-down transistor network 102 is used to drive the data bus 88 and/or address bus 98 to the selected default values when there is no active readout on any of the channels. The preferred technique for selecting this default data pattern is to make the default pattern different from any possible actual data. Additionally, the default pattern should already provide direct current (DC) balance in the event that data is further transmitted serially and without DC balancing encoding.

(12) Regardless of the source of data on the data bus 88 or address bus 98, data is latched inside the output periphery 96 by the clock signal clk 82. Latching of the data synchronizes the readout with the data acquisition system. Data is latched before generation of each new token or as long as data is stable, thereby yielding a new set of latched data for each token. Data can be transmitted serially. The serialization clock is used for generating readout tokens by appropriately dividing the serialization clock.

(13) The division ratio is derived from the quantity number of bits obtained in the output periphery 96 on the data bus 88 and address bus 98 in one shot and the quantity of output serial links to match serialization speed.

(14) Analog values, if provided by a channel, are sampled for further processing at the analog output periphery (e.g., for analog-to-digital conversion) or buffered in preparation for being sent to an external processing system in parallel to the latched digital data.

Based on the above description, features of the disclosed system include the following.

(1) In comparison with DPA, there is no or substantially no risk of a metastability state occurrence, which can corrupt data. Rather than latching asynchronous data using a system clock, as is done in DPA, there is effectively a clock gating structure in the form of the arbitration tree 92. This ensures that latching is performed if the data is already stable due to the order of actions being performed.

(2) There is no or substantially no delay introduced by pipeline stages. Data stored in a channel have a direct path to the output periphery after permission to use the shared data bus is granted. The arbitration process is also fully asynchronous such that signals flowing from stage to stage do not require additional buffering, and construction of the arbitration tree 92 ensures that distance, counted as a quantity of gates, from the top of the tree 92 to each channel is the same.

(3) direct synchronization is not performed using a distributed clock in the channel, which saves space and power. Synchronization is based on fixed token duration that is generated synchronously to create time widows for data. The time between expiration of a prior token and generation of a subsequent token is used to ensure a sufficient duration of time for fetching data from the channel. During this time, data settling time is guaranteed and the data is safely latched when the next token is about to be generated.

(4) There is no polling and read requests are triggered by registration of events in the channels, thereby making the system event driven.

(5) Variations in the delay time of receiving the acknowledge token by a channel is minimized due to the binary tree topology of the arbitration tree 92.

(6) A risk of missing time slots, when at least one channel is requesting readout, but default data is sent, is eliminated as tokens can wait for a propagated request at the top of the tree 92. There are rare situations in which the acknowledge token seen by the cell is too short to be able to trigger a readout because the request was sent too late relative to an active token. However, such a situation does not disturb operation of the system. The channel waits for the next available token and synchronization is preserved by sending the default data to the acquisition system.

(7) Racing between incoming new read requests and an active channel readout is eliminated due to the arbitration tree 92 that determines which request was first and stores this information. This is substantially more advantageous in comparison to the AERD architecture, in which memory blocks are not allocated for arbitration.

(8) There is no prioritization since requests are ordered by their arrival time to the each arbitration tree 92 and, only once the request is satisfied, the next request reroutes the acknowledge path (9) Once established, the acknowledge path persists until the corresponding request is cleared. This feature, in conjunction with continuous generation of new tokens, facilitates a readout phasing circuit because multiple tokens can be fed to a channel in response to only one request

(10) Since the generation of tokens is strictly connected with the acquisition clock, there is no need for additional synchronization, and thus the system can operate based on a single clock signal provided by, for example, an external system. All periods of this clock are used for transmission.

Figure 7:
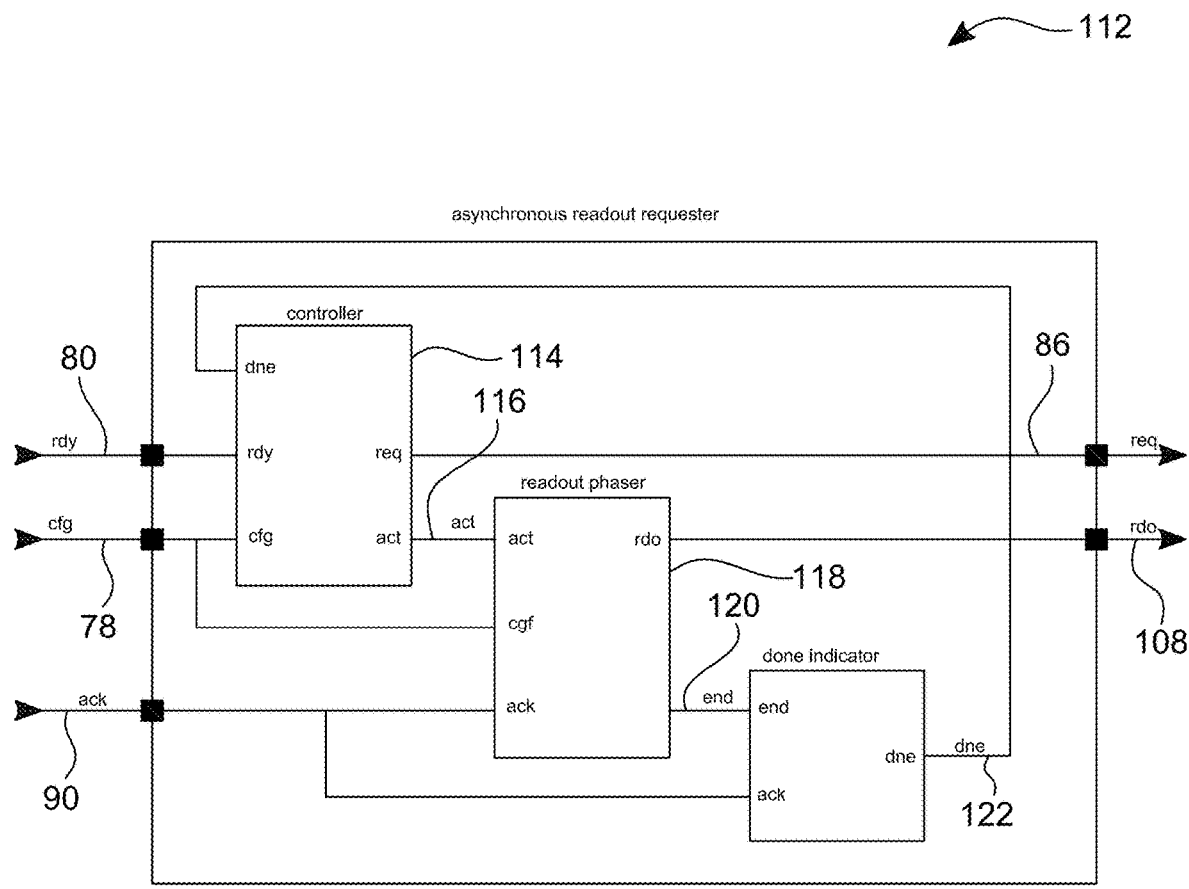
FIG. 7 shows a block diagram of a first embodiment of an asynchronous readout requester.

A readout cycle begins in a cell, in which the ready signal 80 is set, following an operation being performed. The ready signal 80 is activated and fed to the in-channel logic 76 together with the resulting data (digital 74 and/or analog 72). The readout cycle is completed once data from channel are latched in output periphery. The primary block in the in-channel logic 76 is a readout requester 112, which is shown in greater detail in FIG. 7.

The ready (rdy) signal triggers a controller, which then issues a readout request 86. This request is held until the done (dne) 122 signal is no longer active. This feature enables multiple acknowledge tokens to be distributed to the readout requester one-by-one. Simultaneously, an active (act) 116 flag is set, and as a result, the readout phaser 118 transitions from an initial state to an arm state. In this new state, the readout phaser 118 is sensitive to changes on the ack line 90. The controller can also be disabled by using one of the configurations (cfg) bits. In this case, no request is issued, which effectively blocks readout from the channel. When the token arrives at the channel, a first readout phase is initiated by setting one of the bits in the readout (rdo) vector 108 by the readout phaser 118. Each new token arriving at the readout requester 112 causes the position of an active bit of the rdo logic vector 108 to be shifted by one until its position, which is set by the configuration, is reached. Then, an end flag 120 is set and the done indicator block is armed. The readout requester 112 waits for one more token to trigger the done (dne) signal 122, which is then fed back to the controller 114, and the req signal 86 and act signal 116 are deactivated. After the request is cleared, the acknowledge path to the channel is detached. The readout phaser 118 enters an initial state in response to the act signal 116 being reset, in which state there is no active bit on the readout vector 108.

Generally, the process from receiving the token to detaching the acknowledge path is much shorter than the token duration and thus, when the process ends, the token is still active and can be redistributed to another cell. This allows two operations to take place during the lifetime of the token, neither of which is adversely affected by simultaneous operations.

Thus, two functions performed by the readout requester 112 following distribution of the active token to the readout requester 112 include the following.

(1) A readout phase initiation, in which the arriving token initiates a new readout phase that lasts until a new token appears.

(2) A reset initiation, in which no new readout is started. The reset operation is performed immediately to allow as much time as possible to redistribute the still valid token to another requesting channel, if any.

Figure 8:
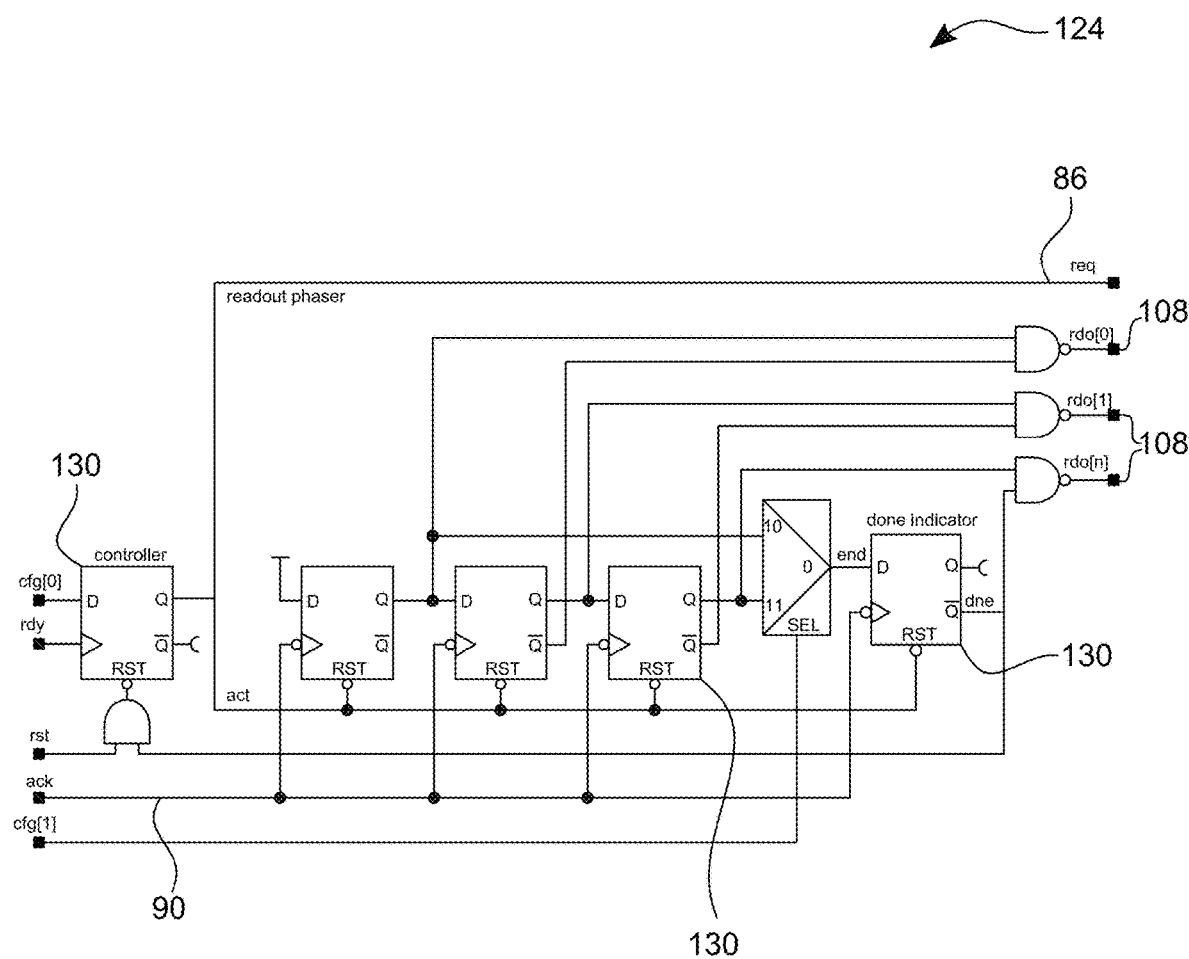
FIG. 8 shows a schematic diagram of a second embodiment of the readout requester.
Figure 9A:
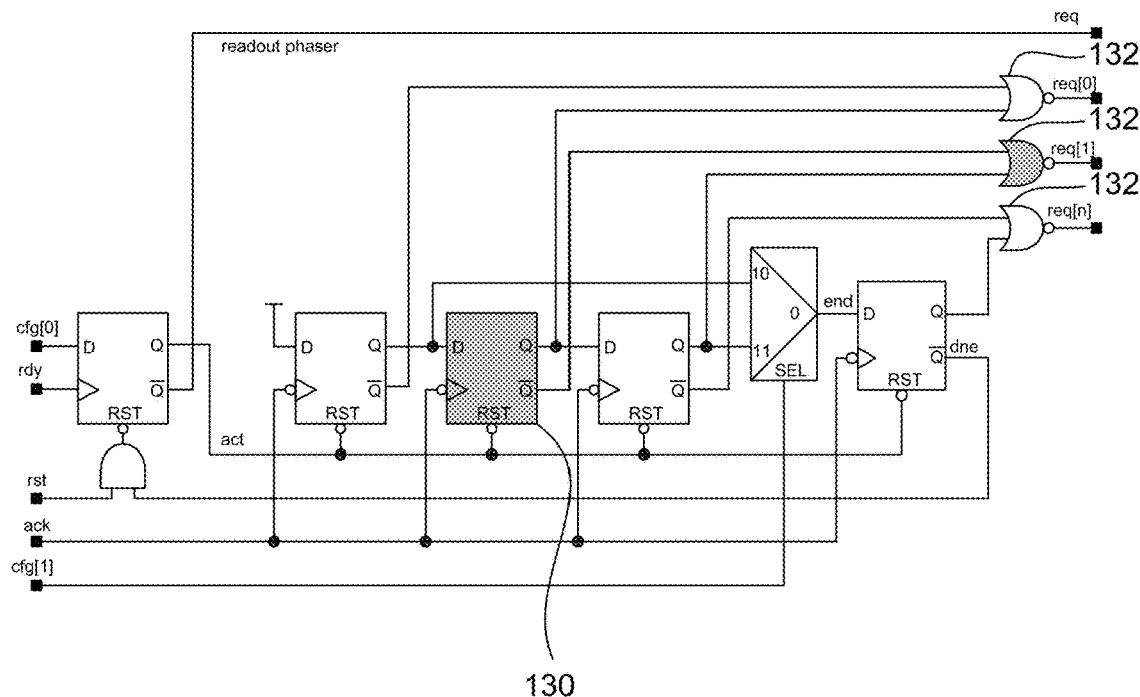
FIG. 9A shows a schematic diagram of a third embodiment of the readout requester with different logic states.

An embodiment of the readout requester 124 is shown in FIG. 8, in which an additional rst signal 91 is used as a global reset signal. An active request is indicated by a high logic state on the req signal 86. The token is active when the logic state of the ack 90 is low and the bit of rdo signal 108 is active when that bit is low. As some applications use different active logic states, an alternative embodiment 126 of the readout requester is implemented as shown in FIG. 9. In this case, active logic states for the rqo, ack, and rdo signals are low, high, and high, respectively.

Figure 10A:
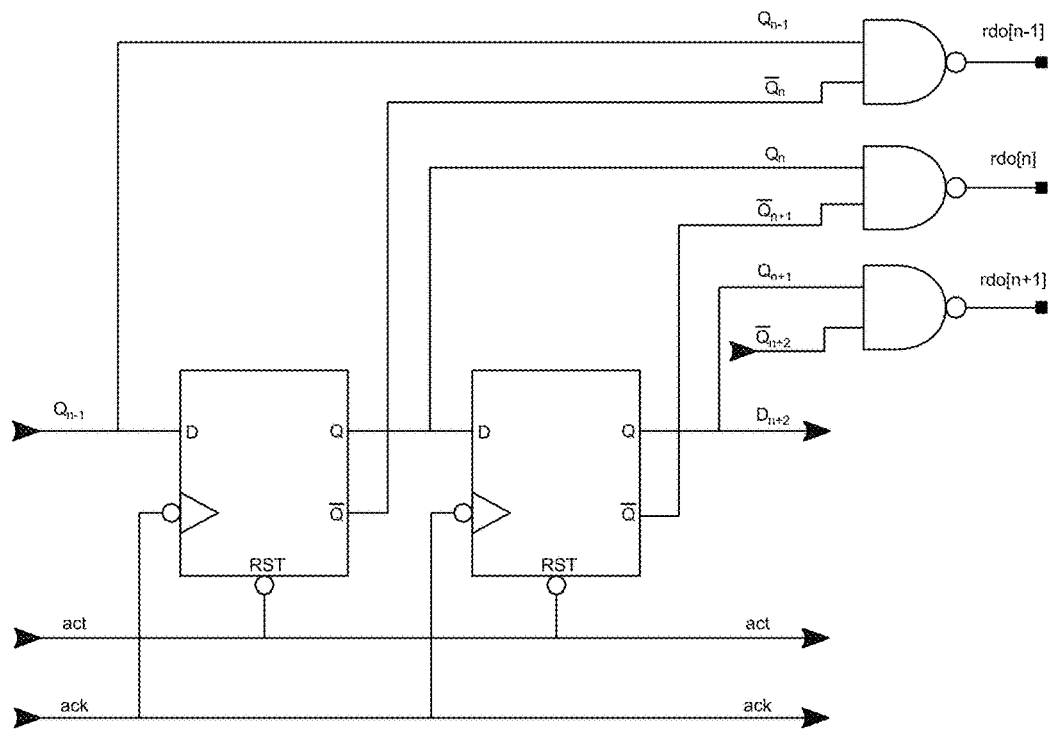
FIG. 10A shows a schematic diagram of a fourth embodiment of the readout requester.
Figure 10B:
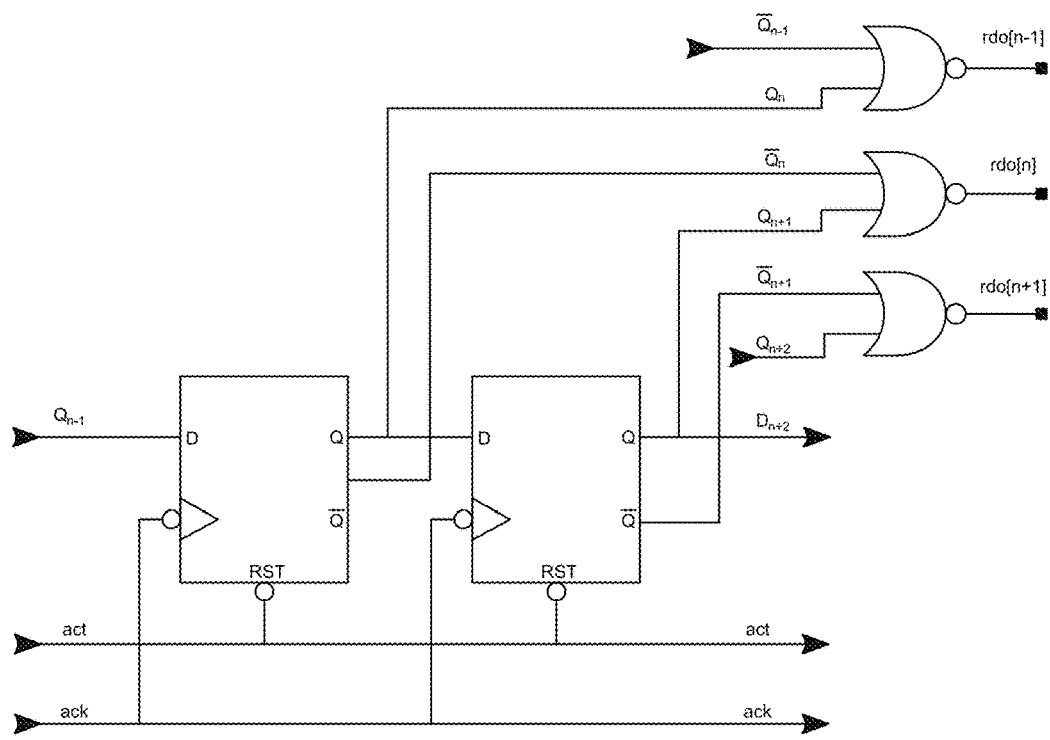
FIG. 10B shows a schematic diagram of a fifth embodiment of the readout requester.

A maximum quantity of readout phases is adjusted by increasing or decreasing the quantity of flip-flops in a chain inside the readout phaser 118. Accordingly, a quantity of flip-flops 130 and gates 132 shown in FIG. 9A can be increased or decreased as shown in FIGS. 10A-B. A mode of operation is illustrated using example waveforms shown in FIG. 11 based on the following assumptions:

(1) acki, ack, req and rdo are active when their logic level is high;
(2) dne is active when its logic level is low;
(3) there are a maximum of two (2) readout phases and the configuration bit cgf1 is used to select between one of two phases; and
(4) two channels are observed.

Figure 11:
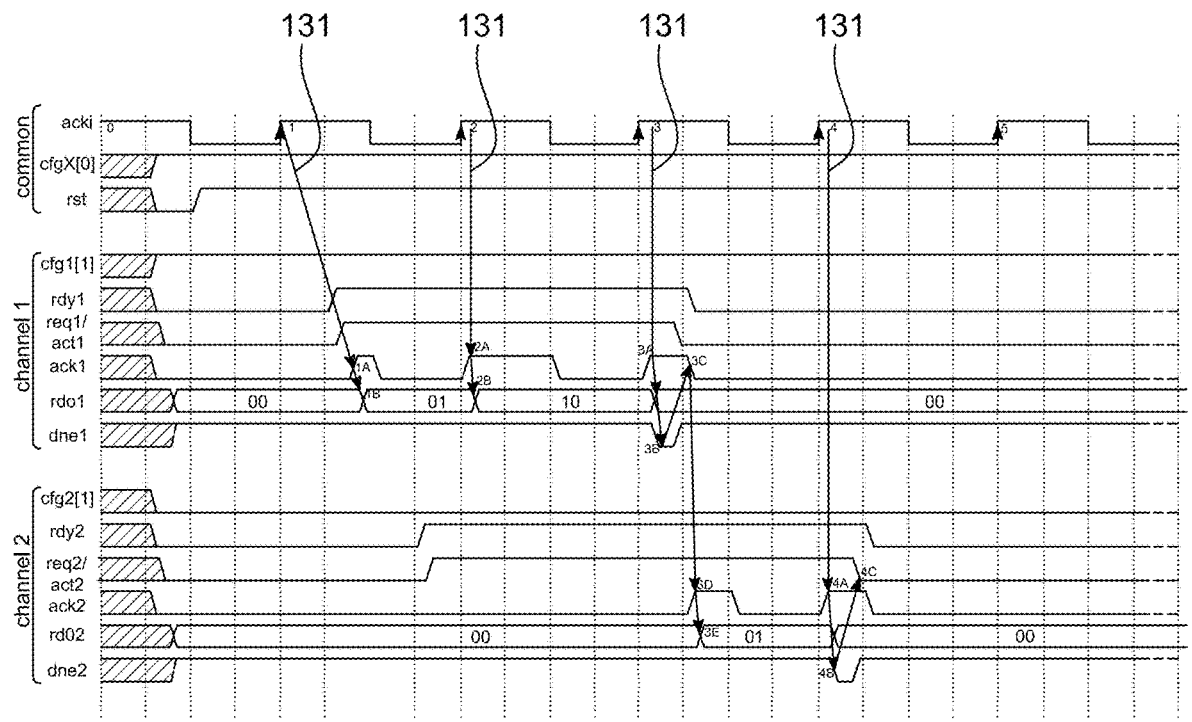
FIG. 11 shows a timing diagram showing readout requester waveforms.

Based on the waveforms shown in FIG. 11, the following features are illustrated:

(1) An action in the in-channel logic is triggered when the active token reaches the channel. The active token at the top of the arbitration tree is represented by one of the logic states on the acki line. In the example shown, the active token is the high state. The arrival of a token on a channel is represented by a state change on the channel's ack input, and this event triggers an action in the in-channel logic, which is illustrated by a sequence of arrows 1-1A-1B, 2-2A-2B, 3-3A-3B, 3-3D-3E, 4-4A-4B shown in FIG. 11 by arrows 131;
(2) based on the acki duty cycle, flip-flop delay, and arbitration tree propagation time, a minimum readout phase time is determined; and
(3) after the reset state, the active token is redistributed to another channel as illustrated by a sequence of arrows 3-3A-3B-3C-3D-3E shown in FIG. 11 by arrows 131.

In one or more of the disclosed embodiments, the duty cycle of the acki signal is selectable to maximally extend readout phase time. As a result, redistribution based on feature (3) directly above occurs without risking a collision on the data bus. Conventional architectures require that two edges of the acknowledge signal be provided to the arbitration tree. For example, a channel is selected on a falling edge of the acknowledge signal and disabled on the rising edge. Such behavior of the readout system may limit, in advance, the settling time of the data on the data bus by the duration of the high state of the acknowledge signal. These implementations also impose further restrictions on the minimum duty cycle of the acknowledge signal, and thus the ratio between the high logic state and low logic state, since the duration of the high state is required to be long enough to perform additional functions.

Figure 9B:
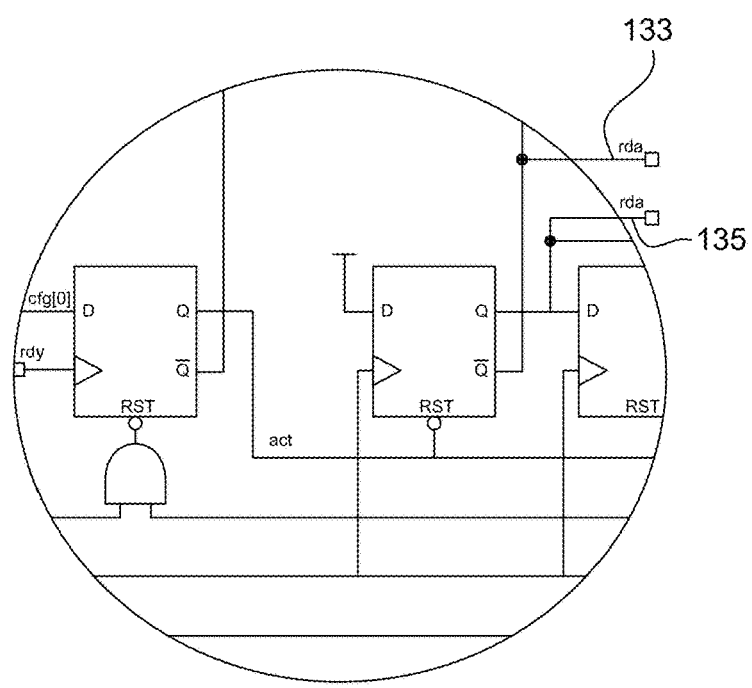
FIG. 9B shows a schematic diagram of the third embodiment of the readout requester with an additional signal that indicates activity of channel readout phases.

From the readout requestor block, additional rda (readout any) signals are derived as outputs from a first flip-flop in the readout phaser, as shown in FIG. 9B. The rda signals 135, 133 are used as an indicator that readout from the channel is occurring no matter which readout phase is currently active. The rda signal is effectively a logical sum of all readout signals without the need for adding additional logic structures.

Figure 12:
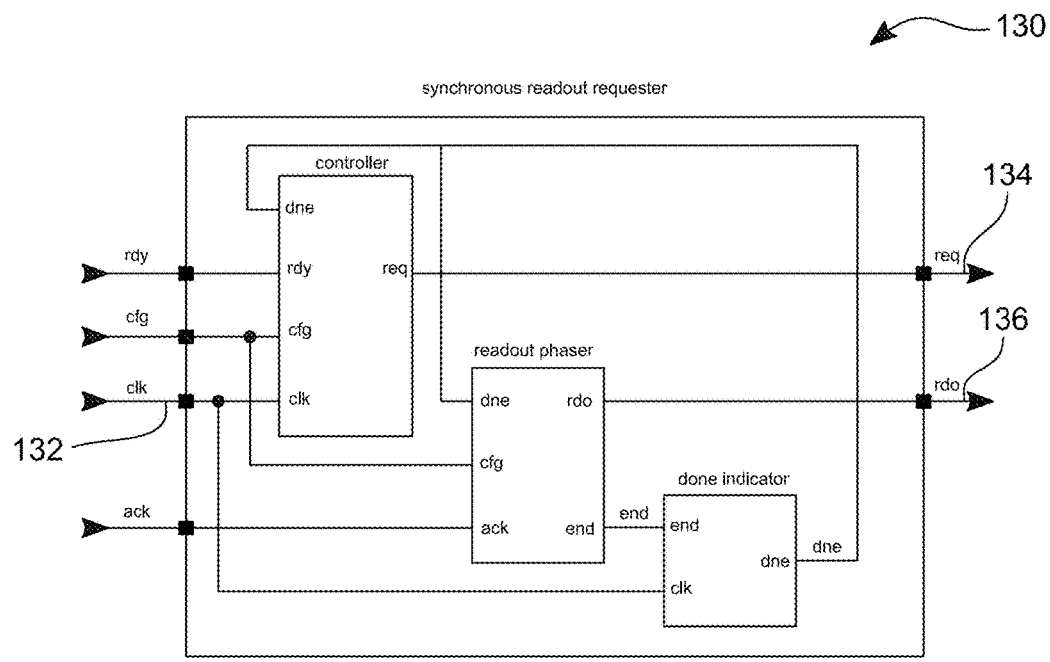
FIG. 12 shows a block diagram of an embodiment of a synchronous readout requester.
Figure 13:
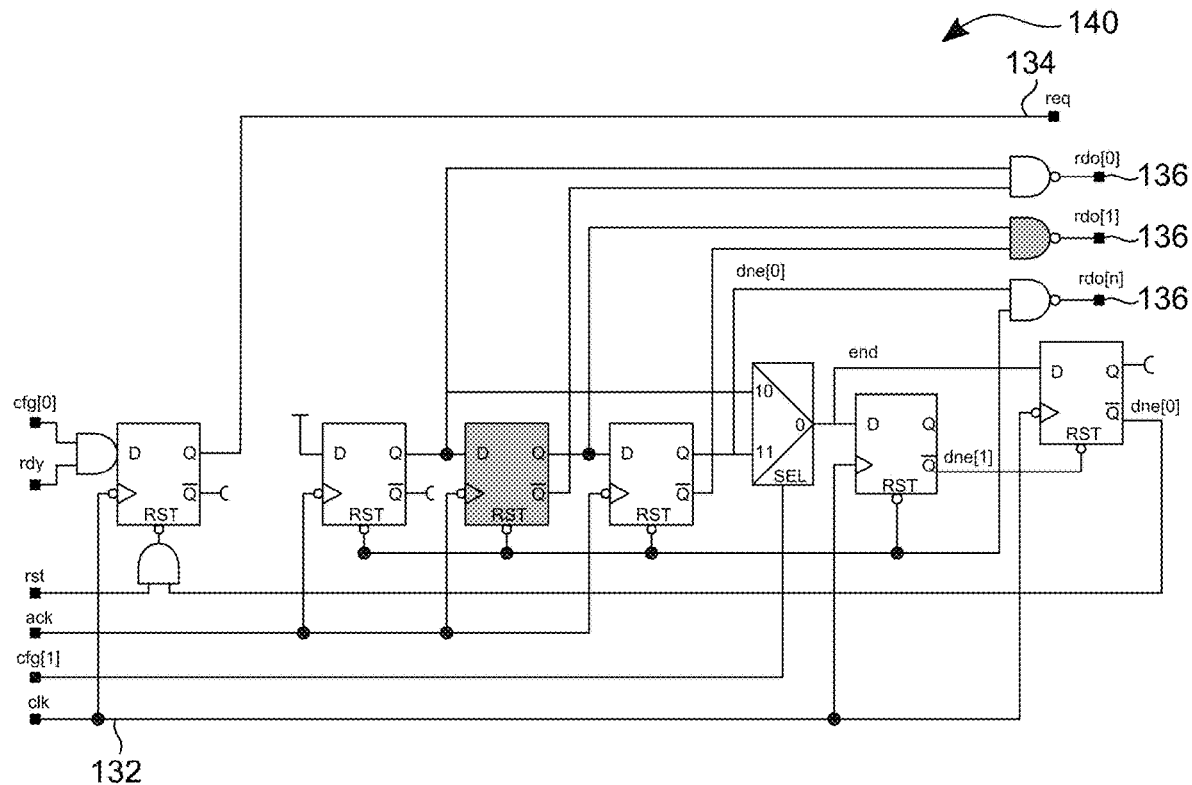
FIG. 13 shows a schematic diagram of an embodiment of the synchronous readout requester shown in FIG. 12.

An advantage of the disclosed embodiments is further illustrated by the synchronous readout requester with a distributed clock 130 shown in FIGS. 12 and 13, in which a clk signal 132 is added. The clk signal 132 has the same source as the acki signal from the top of the arbitration tree, but in those embodiments, it is distributed directly to channels, thereby omitting the arbitration tree. In this embodiment 130, the acknowledge signal does not have the two functions, which means that the reset is not initiated by a token, but rather the clk signal 132 is used to initiate the reset phase. In addition, the request signal 134 is set on the edge of the clk signal 132. These modifications make the rdo signals 136 at the top of the arbitration tree synchronous with respect to the acki signal. Thus, a distinction between empty data and valid data can be made based on the rdo signals 136 rather than by using the pull-up/pull-down network. However, clock distribution needs to be performed, which adds complexity to the routing process and results in greater power consumption. Using the clk signal 132 as a trigger, rather than signals having determinate timing relations, can also introduce metastability. This embodiment 130 represents a break from an event-driven paradigm since synchronization is made on an in-channel logic level, which is not the case in the asynchronous readout requestor described above.

In addition to the readout requester, the in-channel logic includes transmission gates and/or tristate buffers that are used in conjunction with multiplexers. As a result, two techniques for selecting data to drive a data bus are as follows:

(1) using multiple banks of tristate buffers/transmission gates, each bank of which is connected to the data and/or analog bus, only one or neither of the banks are active at a given time, and activation is performed by using the rdo 136 vector bits; and
(2) using one bank of tristate buffers/transmission gates and multiplexers, in which a multiplexer is controlled by the rdo vector 136 between the input data from the cell and the buffers that selects data sent at a given time.

Figure 14A:
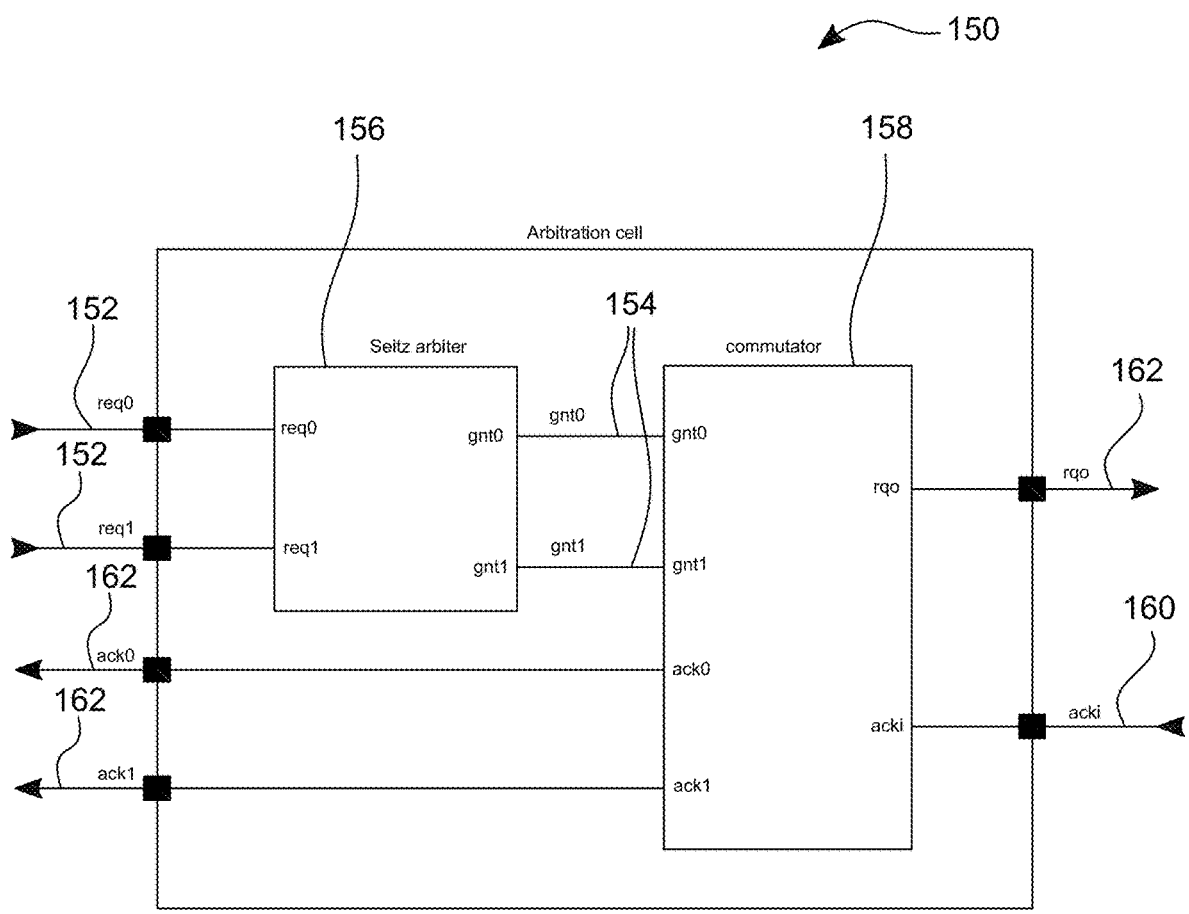
FIG. 14A shows a block diagram of an embodiment of an arbitration cell.

After the request signal 134 is activated, the associated request is provided to the arbitration tree, following which the arbitration process occurs. This allows the token to be distributed to the channel. The arbitration tree is implemented using blocks referred to as arbitration cells, as shown in FIG. 14A. Specifically, a simple arbitration cell, which is referred to herein as "arbitration cell type 0" in FIG. 14B, upon receiving (read) request signals 152, selects one of the request signals and routes an acknowledge signal 160 that reaches this cell from the cell above in the arbitration tree, which is farther down the arbitration tree in the direction from which the accepted request came. Routing is performed by essentially gating the acknowledge signal (i.e., acknowledge gating). This create a continuous path for acknowledge token from the top of the tree to the bottom of the tree where the requesting channel is located. The acknowledge gating is performed in a logic block referred to herein as the commutator 158 and is performed using grant signals 154 (e.g., gnt0, gnt1) generated inside the arbitration cell 150. These grant signals are generated by an arbiter 156.

Figure 15:
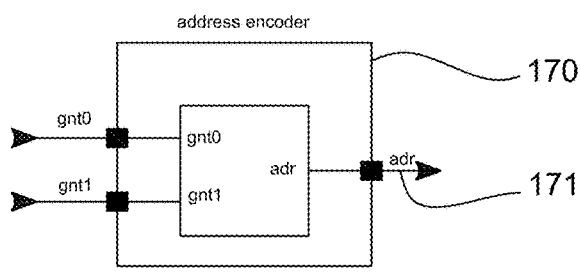
FIG. 15 shows a block diagram of an embodiment of an address encoder.
Figure 16A:
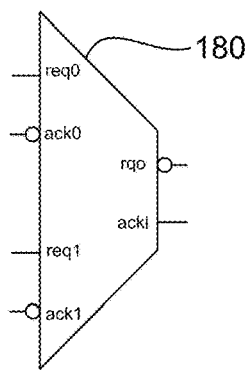
FIGS. 16A-D show symbols representing arbitration cells depending on a type of arbitration cell and address encoder inclusion.
Figure 16C:
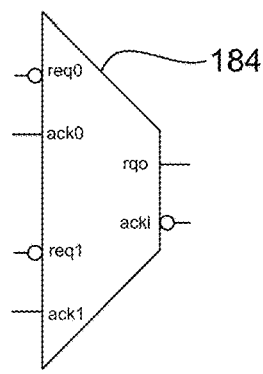
Figure 16B:
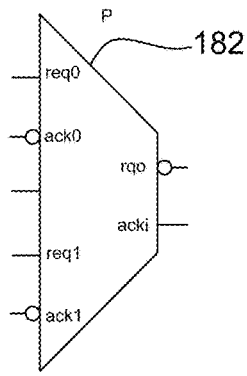
Figure 16D:
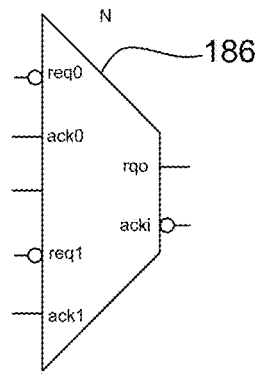

The arbitration cell 150 includes two blocks as follows.
(1) A Seitz arbiter 156 determines which of the req (request) signals 152 arrived first and activates the corresponding gnt (grant) signal 154, which are mutually exclusive. That is, only one of the gnt (grant) signals 154 is active at any time.
(2) A commutator 158 establishes a path for the acknowledge token by directing the acki (acknowledge) signal 160 to the output ack (acknowledge) signal 162 corresponding to the active gnt signal 154. The commutator 158 also indicates if any of the gnt signals 154 is active and, if so, sends a request to the next arbitration stage by activating the rqo (request output) signal 162. For each arbitration cell 150, an address encoder 170, as shown in FIG. 15, can be added to obtain an address of the cell to which the acknowledge path is established.

Due to the structure of the arbitration tree, which is divided into multiple stages that include multiple arbitration cells, each stage can provide one bit of the address and this bit is provided by one of the cells in the stage. To satisfy this requirement, the adr signal 171 drives one line of the address bus using a tristate buffer. The adr output is enabled when any of the gnt signals is active, and the driven value depends on which of the gnt signals is active. When none of the gnt signals is active, the adr output is in a high-impedance state.

The logic state, which is considered to be active or inactive, depends on the physical implementation. To minimize the quantity of transistors used during implementation, two types of blocks that differ in logic polarity, P-type 180, 182 and N-type 184, 186, are used, as shown in FIGS. 16A-D. Blocks 182, 186 include an address encoder and blocks 180, 184 do not include the address encoder. A circle at any port indicates that the corresponding signal is considered to be active when its logic state is low.

Figure 17A:
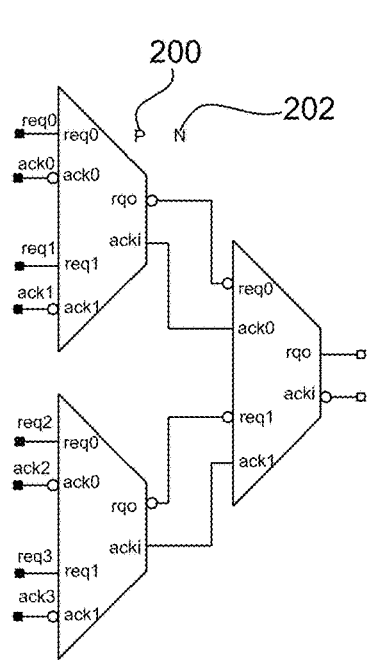
FIGS. 17A-B show block diagrams of alternating configurations of P-type stage and N-type stage arbitration cells.
Figure 17B:
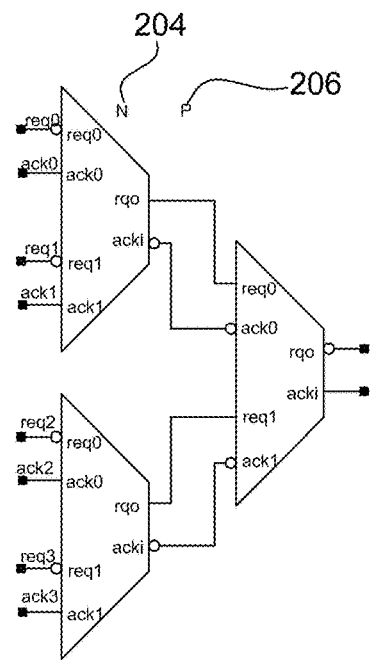
Figure 18:
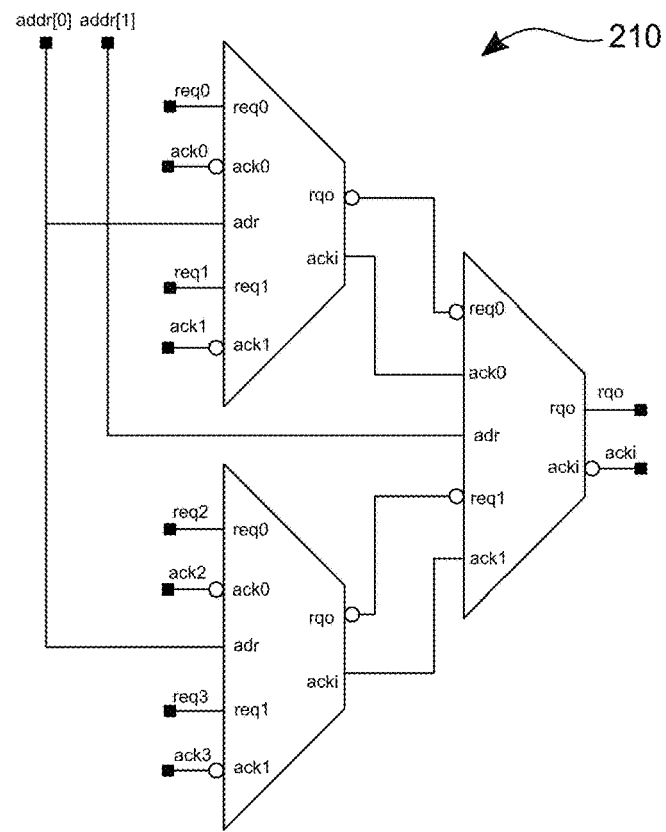
FIG. 18 shows a block diagram of an embodiment of arbitration trees with address encoders.

The arbitration tree is configured as a structure including $M=\lceil \log_2 N \rceil$ stages, in which N represents a quantity of cells to be read out. Each stage includes $n(m)=n(m+1)\times 2$ arbitration cells where $m \in [1, MM]$ and $n(M)=1$. The quantity of transistors is minimized by configuring stages using alternating types of arbitration cell as illustrated in FIGS. 17A-B. Based on the cell type, two types of stages are used, P-type 200, 206 and N-type 202, 204. Connections between stages 200, 202, 204, 206 are also shown in FIGS. 17A-B. One benefit of using alternating stage types is that there is no additional logic required between stages. Further, it does not matter which stage type is used first, and the selection of stage type can be made based on logic states of other signals in the system. If address encoders are used, the arbitration tree 210 is configured as shown in FIG. 18.

The arbitration cell includes an arbiter that decides which one of the two (read) request signals is to be selected. While the arbiter does not have a preference for which one of the two (read) request signals is selected for routing to the output, only one of the two read request signals is selected. This selection is a function of the arrival time, that is, the first request signal to be received dominates, and is thus selected. Switching from the selected request signal to another request signal is not permitted for the entire length of time during which the selected request signal is active. When two request signals arrive simultaneously, one of the request signals is selected. This selection is random and does not generate ambiguous intermediate steps at the output of the arbiter. Transition from selection of one request signal does not include any time when both signals are selected or switching back and forth between selected request signals are eliminated.

The selected request signal generates a corresponding grant signal 154, which then gates routing of the acknowledge signal. Blocking of the acknowledge paths results in no activity being sent to the channel that issues its read request signal. Conversely, unblocking this path, enables sending an acknowledge token down the acknowledge path to activate or deactivate a channel for starting and stopping transmission of data by the channel on the common data bus. A token is an active state on the acknowledge path with an assigned expiration time. After this expiration time, the acknowledge signal changes its state back to being inactive. This functionality is achieved by using a digital clock to generate the acknowledge signal. This clock includes alternating logic states, high and low, that repeat at a given frequency. The ratio of the duration of the high and low states is referred to as a duty cycle. The logic state of a digital clock can be associated with the activity of a token, and this association depends on the blocks used to build the arbitration tree and their polarity. The duty cycle and frequency of this digital clock signal is selectable or programmable over a broad range or latitude.

Figure 14B:
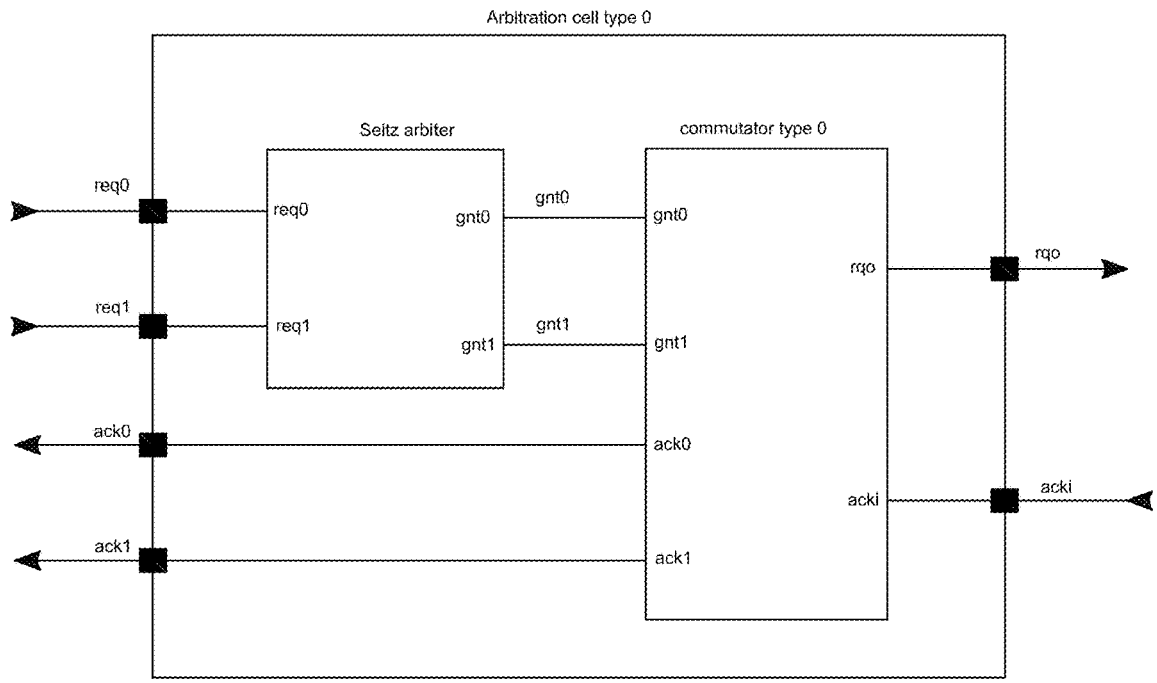
FIG. 14B shows a block diagram of an embodiment of an arbitration cell shown in FIG. 14A of type 0, which is referred to herein as "arbitration cell type 0"

The simple arbitration cell 150 shown in FIG. 14B utilizes a single Seitz arbiter 156, which can accept request signals at any time, regardless of the current level of the acknowledge signal. Switching to read out, a new channel occurs immediately after finishing a current readout. For example, the Seitz arbiter 156 switches to the second channel after the first request signal is deactivated, which corresponds to completion of reading of the first channel, in the case of two request signals being activated simultaneously. In such a situation, an active state of one output of the Seitz arbiter 156 is deactivated and the second output is activated. However, such a smooth transition is only possible if the request output from the arbitration cell is kept active during the entire described process. Otherwise, an undesirable situation may occur, in which a cell that is located higher up in the arbitration tree identifies a change, even a short one, on the request output line and interprets this change. as no active requests. In the result, it disconnects the acknowledgement path. Under these conditions, a short phenomenon on the acknowledge line may occur that reaches the second channel and triggers a readout even if the acknowledge line changes back to the inactive state. Thus, the arbitration cell shown in FIG. 14B is not suitable for some applications.

Figure 14C:
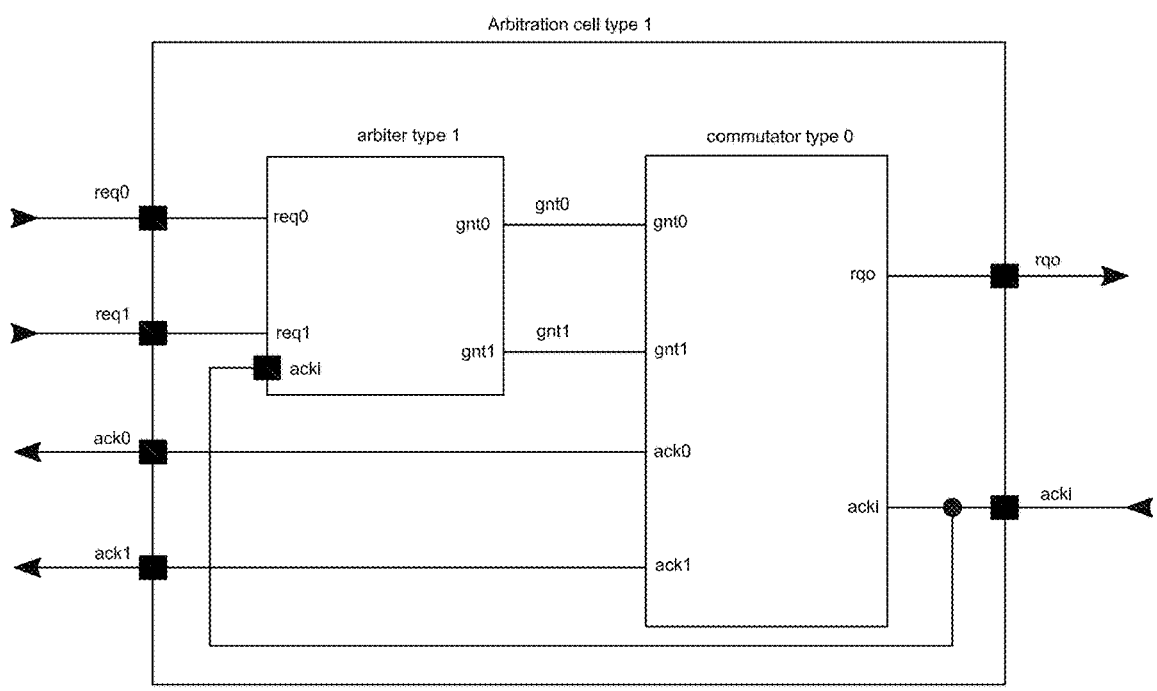
FIG. 14C shows a block diagram of an embodiment of an arbitration cell, which is referred to herein as "arbitration cell type I"
Figure 14D:
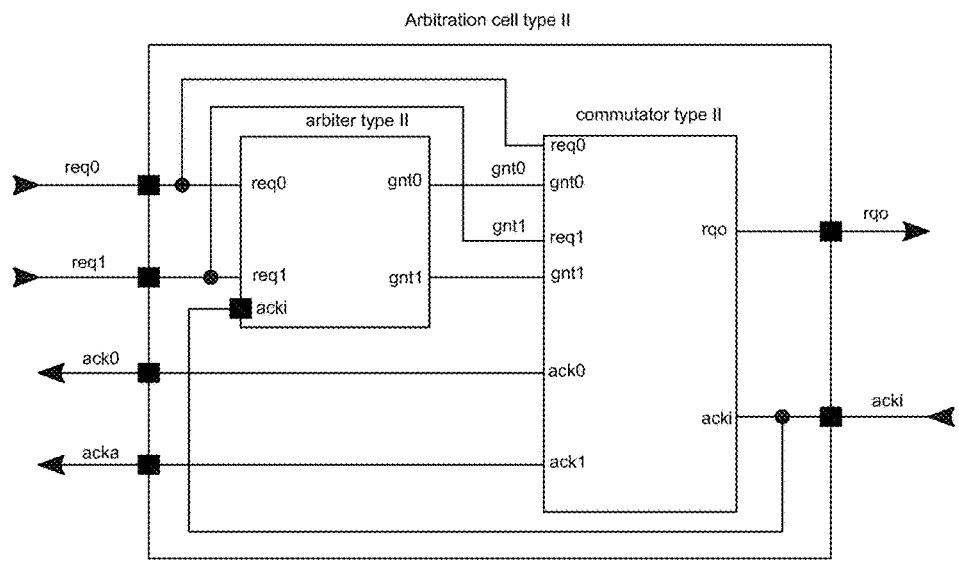
FIG. 14D shows a block diagram of an embodiment of an arbitration cell, which is referred to herein as "arbitration cell type II"
Figure 14E:
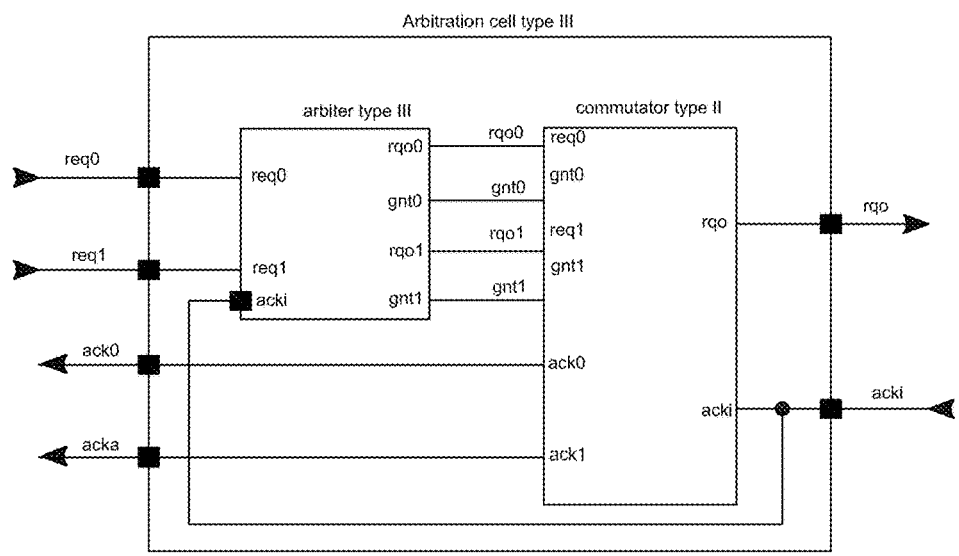
FIG. 14E shows a block diagram of an embodiment of an arbitration cell, which is referred to herein as "arbitration cell type III"

The request signal that leaves the arbitration cell is generated in the commutator 158 logic block as a logic sum of the incoming request signals (i.e., it is activated when at least one of the input request signals is active) The inputs to this sum can be taken from the grant outputs of the arbiter as shown in FIG. 14C, directly from the inputs to the arbitration cell as shown in FIG. 14D, or can be generated by additional logic inside an arbiter as shown in FIG. 14E. The apostrophe characters shown in FIGS. 14C and 14E indicate that mixing different commutator and arbiter embodiments may vary the functionality of the arbitration cell. Accordingly, both the commutator and the arbiter are typically configured as a matched pair.

Figure 19A:
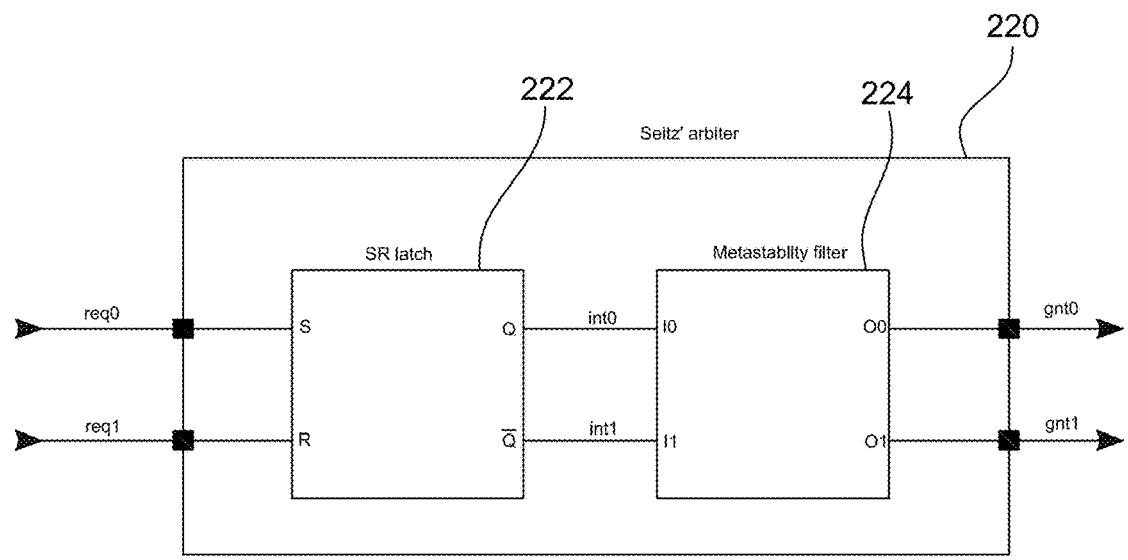
FIG. 19A shows a Seitz arbiter.

The core of the arbitration cell includes the Seitz arbiter 220, an embodiment of which is shown in FIG. 19A. The Seitz arbiter 220 includes an SR latch 222 and a metastability filter 224. The SR latch 222 is a bistable multivibrator that stores state information. The SR latch 222 includes two inputs (S and R) and two outputs (Q and ~Q). The mode of operation is as follows (1) In an idle state, inputs S and R are inactive, which results in both outputs Q and ~Q being inactive as well. Some studies refer to this state as a forbidden state, but this applies to standard logic circuits, in which ~Q is a negated version of Q. However, this does not apply to the subject arbiters.

(2) A set operation occurs when, during the idle state, S becomes active, which causes a transition of the Q output to the active state.

(3) A reset operation occurs when, during the idle state, R becomes active, which causes a transition of the ~Q output to the active state.

(4) In a hold state, both inputs are active, but only one output is active. The active output is related to the most recent set/reset operation.

Different types of the SR latch 222 may be implemented depending on the logic state of the inputs and outputs in the idle state. Two of these types can be implemented using two gates with cross-connected outputs to inputs. For example, FIGS. 20A-B show an embodiment 230 of the SR latch using NAND gates and its corresponding truth table, in which inputs are low and outputs are high during the idle state. FIGS. 21A-B show an embodiment 240 of the SR latch using NOR gates and its corresponding truth table, in which inputs are high and outputs are low during the idle state.

Since the input signals of the SR latch in the arbiter are asynchronous, a situation can occur in which both inputs transition to an active state at the same or almost the same time. This situation creates a race condition, and the SR latch must resolve this condition and switch to the hold state with an active output that represents a result of this arbitration process. The disclosed embodiments of the SR latch perform this process, but may take an indefinite amount of time, during which both outputs are in a metastable state that is neither a high nor a low logic state. Physically, this process is manifested as a voltage level between a logic supply voltage and ground. Metastability in a circuit can lead to errors in operation. Metastability can also propagate to other logic blocks or be mistakenly transformed into a valid logic state. In the arbitration tree, the latter possibility is undesirable as this can break the mutual exclusivity requirement if both outputs are in the active state, which may result in collision on the data bus. For this reason, a metastability filter after the SR latch 222 is implemented. This metastability filter 224 does not allow metastability to propagate to other blocks and forces outputs of the Seitz arbiter 220 to stay in an inactive state until the arbitration process has ended.

Implementation of the metastable filter 224 is different for NAND and NOR SR latch configurations, however, both configurations can use the same quantity of transistors. Embodiments of pairs of metastable filters are as follows.

(1) Embodiments of a standard filter 250, 252, 254, 256 are shown at the gate and transistor level in FIGS. 22A-E and implemented using two cross-connected (between an input and one of the power lines) inverters and buffers at the output. During the idle state, both outputs are freely connected to the power lines corresponding to the inactive state regardless of the presence of the cross-connection. When one of the inputs changes (the SR latch outputs are inputs for the metastable filters) the second input is used as a supply voltage for an active state. When both inputs change, a maximum output voltage cannot be higher than a metastable voltage and is attenuated by another input with a metastable voltage level, which cannot fully open the driving transistor. As a result, both filter output voltage levels are less than a maximum metastable voltage and these levels are continuously treated as being inactive by successive buffers until the inputs transition from the metastable state to two final and opposing states.

Figure 23A:
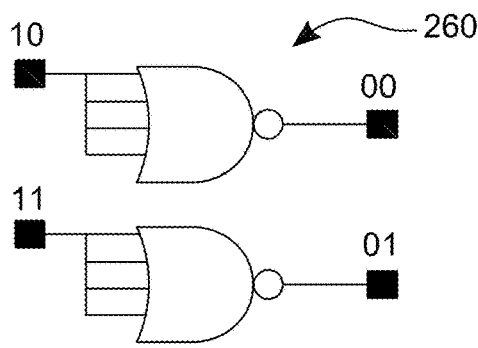
FIGS. 23A-B show metastable filters implemented using multiple input NOR and NAND gates.
Figure 23B:
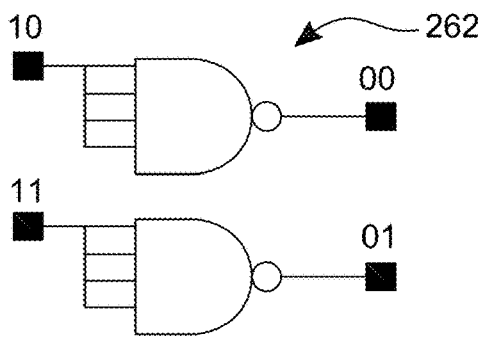

(2) Embodiments of a filter 260, 262 shown in FIG. 23A-B are based on a standard logic cell implemented using multi-input NOR/NAND that, when all inputs are connected together, can effectively be seen as an inverter, in which the transition threshold is shifted toward the value of one of the supply lines. The shift is created by the difference in driving strengths of the transistors implementing the gate for different states at the output. In contrast to the standard filter described directly above, there is no attenuation element and the certainty of mutual exclusion is obtained by checking that a maximum metastable voltage level remains lower than a toggle level of the skewed inverters. An advantage of this embodiment is that it can be implemented automatically using a standard cell library with place and route tools.

(3) Embodiments of a filter shown in FIG. 23C-D are based on an inverter with hysteresis on the transition characteristic. These embodiments follow operating principles similar to those based on multi-input gates, which include shifting the transition threshold of the inverter. However, rather than operating on transistor driving strengths, these embodiments introduce positive feedback from output to input, and thus additional voltage above the nominal transition needs to be used to force the output to change its state. There is no need for switching feedback in both directions, as there is a risk of a metastable state only when transitioning from inactive to active states at the SR latch output. This second feedback would make the hysteresis loop wider and is undesirable because it increases a probability that both filter outputs are in the active state as a result of fluctuations at the inputs. As a result, the embodiments shown in FIGS. 23E-F with active feedback in only one direction, can be used.

The filters described the above include an inverting function, so that the output active state is inverted. Based on arbitration cell logic polarity in different types of arbitration cell, a NAND SR latch with a P-type metastability filter is used to implement an arbitration cell type P 250, 252, 260 and a NOR SR latch with an N-type metastability filer 254, 256, 262 is used to implement an arbitration cell type N.

A commutator is the next block used to implement the arbitration cell. The function of the commutator is to merge information regarding activity on the Seitz arbiter outputs into one signal, which is equivalent to generating a logic sum of the signals, which is then provided to the next arbitration stage. Based on signals from the Seitz arbiter, the commutator also creates a logic path for the acki signal. After this path is created, the state of the acki signal, based on the commutator input, is transferred to one of the ack outputs, which corresponds to the active arbiter output. If both arbiter outputs are inactive, the state of the acki signal is not transferred. Two complementary embodiments of the commutator 270, 280 with corresponding truth tables are shown in FIGS. 24A-D. These embodiments use the same quantity of transistors, and are used in arbitration cell types P and N, respectively. States 272, 282 in the corresponding truth tables are forbidden states that should not appear since both gnt signals should not be active at the same time.

In the arbitration cell type I shown in FIG. 14C, the logical sum is not sensitive to a short-lived phenomenon that occurs when the arbiter cell toggles the selection between the two inputs and when it is expected that acknowledge should be relayed from one cell output to another. This relaying may not occur correctly as a result of a short moment, during which both outputs of the Seitz arbiter are not active while transitioning from one state to another state. This is the problem that was described for arbitration cell type 0

Thus, the inputs to the logical sum taken from the inputs of the Seitz arbiter cell should be free of this short-lived phenomenon. The gating of the acknowledge signal (i.e., acknowledge gating) and logical summing of request signals may be implemented using logic circuits including NAND and/or NOR gates, depending on a desired active logic polarity of the signals in the arbitration cells on a given level of the arbitration tree. The active logic polarity determines the voltage level corresponding to the digital value of the signals, and can be different for different signals. The logic polarity can be toggled from one stage of the arbitration tree to another stage of the arbitration tree to simplify the logic design, or can be kept the same, which may require more logic gates.

Two embodiments of the Seitz arbiter and commutator include the P type and the N type. These embodiments are generally implemented to work optimally with both positive and negative active polarities of the signals. For ease of understanding and presentation, the embodiments disclosed herein use the terms, arbiter, Seitz arbiter, commutator, arbitration cell, OR block, and/or AND block, which are not specified as to the polarity of these features. Nevertheless, the actual implementation of these features as P type and/or N type would be understood by one skilled in the art as described herein in view of DeMorgan's laws.

The arbitration cell type 0 can be used in readout systems, in which new read request signals do not arrive during times when the acknowledge signal, which is sent down the arbitration tree, is active. Should this condition not be met, using one Seitz arbiter in the arbitration cell is insufficient for accurate arbitration. The active acknowledge token is defined as that token that propagates down the arbitration tree, is gated through all the arbitrations cells on this propagation route, reaches a channel that requested an output of data, and causes either starting or stopping of data communication from the requesting channel. Each time gating of the acknowledge token occurs, an arbitration cell in the arbitration tree, and thus a channel at the end of the route, encounters a transition or edge. Transitions essentially cause actions in the channels with respect to data transmission, such as commencement of data outputting, moving from one readout phase to another, ending data outputting, and the like.

If it is possible to assure that all read request signals arrive or be accumulated during the inactive state of the acknowledge signals, readout systems can use the arbitration cell type 0 for the readout management on all the levels of the arbitration tree. However, if this condition cannot be guaranteed, the simple arbitration cell type 0 can be used on a top level of the arbitration tree, since arbitration cell type 0 does not propagate its output request further, but arbitration cells positioned below the top level of the arbitration tree must be different. These lower-level arbitrations cells should not only decide which of the two read request signals can be serviced, but should also include new read request signals that arrive during the active level of the acknowledge signal in this arbitration. The latter goal presents a need for arbitrating between the read request signals and the acknowledge signals. This leads to the general concept of the readout control system with arbitration that is operated without distributing any system clock to channels. Channels may send readout requests asynchronously and any possible collisions are resolved at the arbitration-tree level regardless of when the readout request was sent.

Figure 19B:
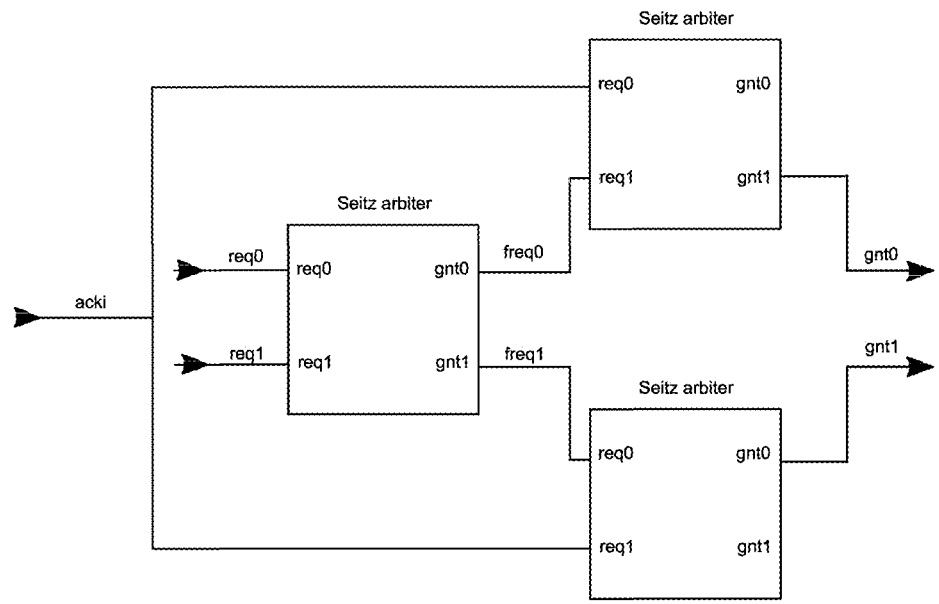
FIG. 19B shows an embodiment of arbiter type I.

Further, in a preferred embodiment, there are two options for a more complete arbitration that may be utilized. The first option uses the arbiter type I shown in FIG. 19B and the commutator type 0 shown in FIG. 24E, which is a logically equivalent embodiment of the commutator type 0 that is compatible with the arbiter type I. Together, these functions form the arbitration cell type I. The arbiter type I first arbitrates between the two request signals keeping the result internally, and the winning request signal is arbitrated with the acknowledge signal.

Figure 19C:
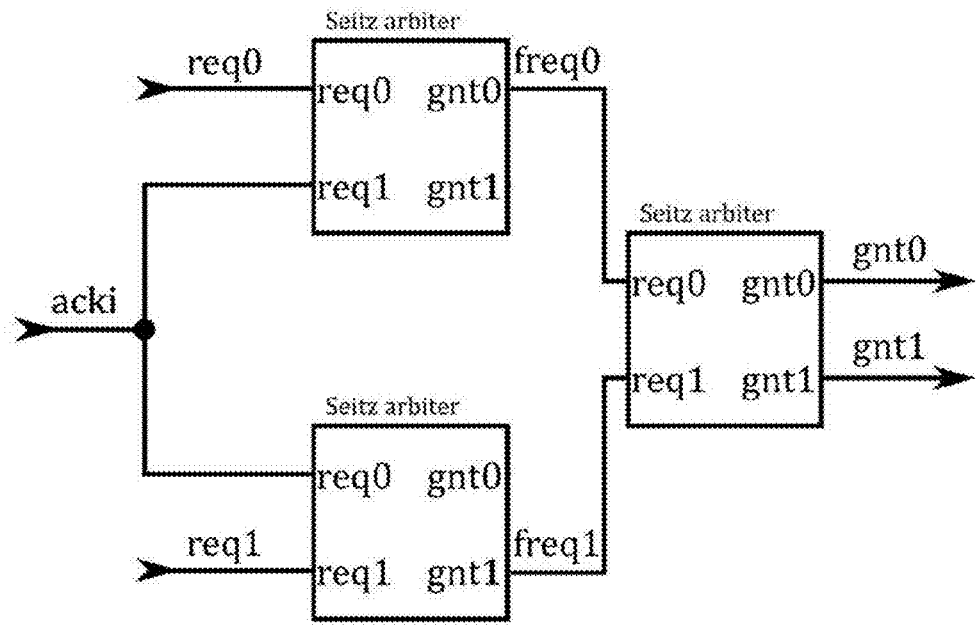
FIG. 19C shows an embodiment of arbiter type II.
Figure 19D:
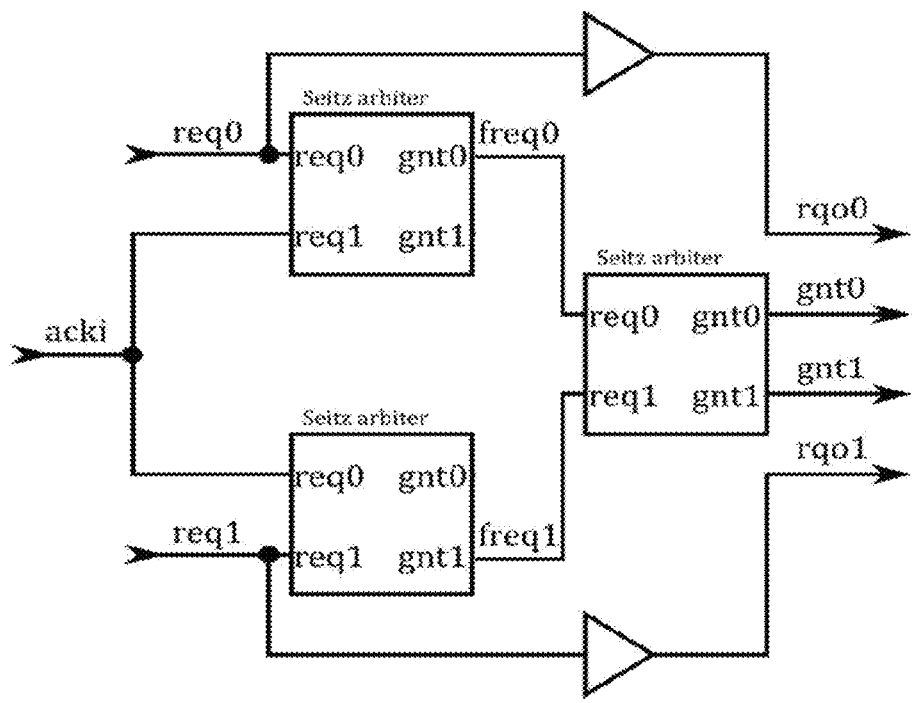
FIG. 19D shows an embodiment of arbiter type III that may be subject to blockage.
Figure 19E:
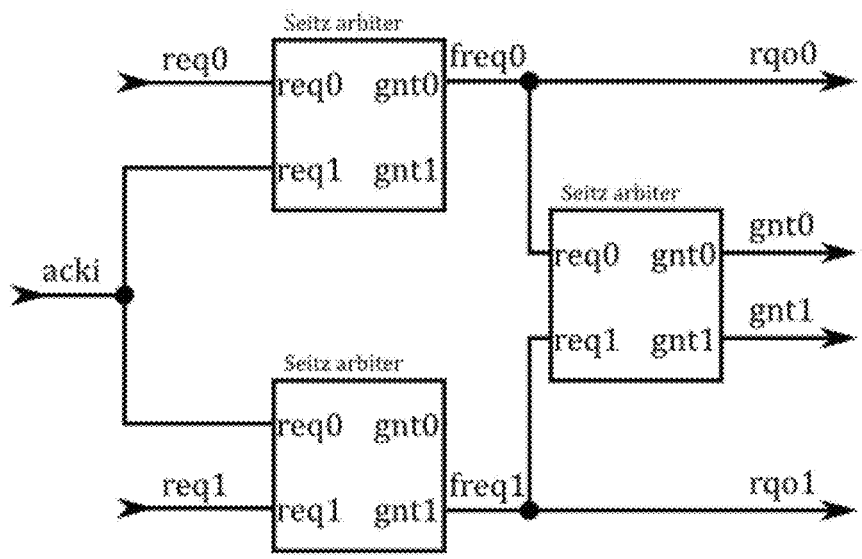
FIG. 19E shows an embodiment of arbiter type III that is immune to blockage.
Figure 22A:
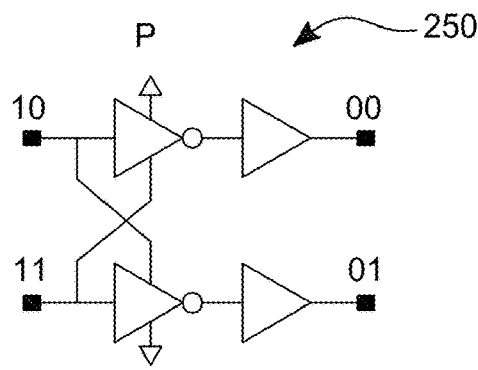
FIGS. 22A-D show metastable filters implemented using inverters and buffers.
Figure 22C:
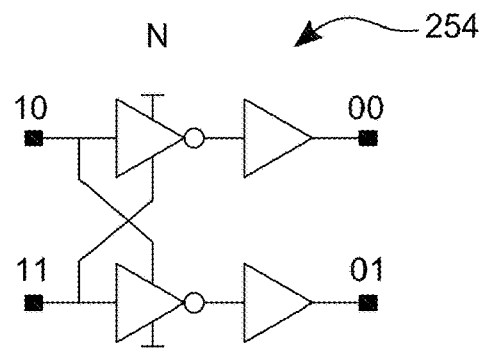
Figure 22B:
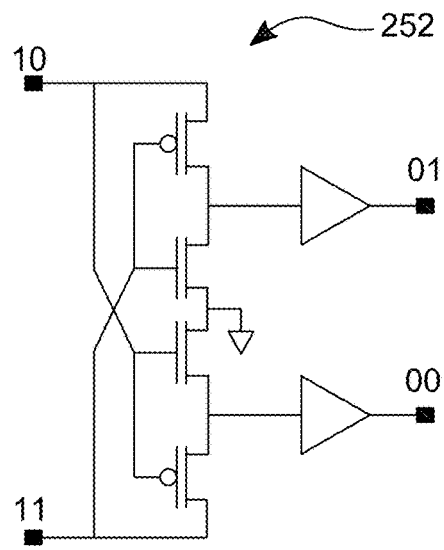
Figure 22D:
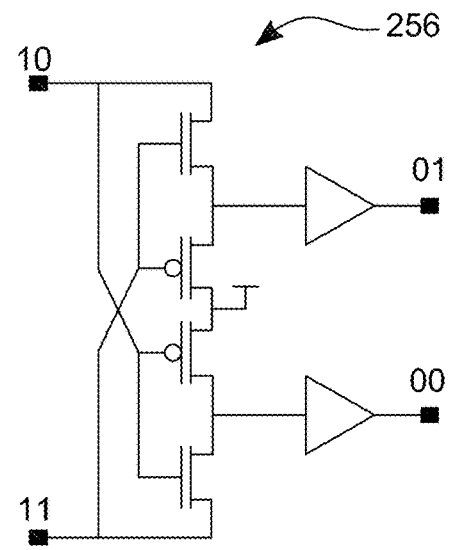

The second option is implemented either as the arbitration cell type II with the arbiter type II shown in FIG. 19C, or as the arbitration cell type III with the arbiter type III shown in FIG. 19D and FIG. 19E. Both types utilize the same commutator type II shown in FIG. 24, which is a logically equivalent embodiment of the commutator type II that is compatible with the arbiter type III. These arbiters, that is, types II and III, reverse the operations relative to arbiter type I, thereby first realizing arbitration of each individual request signal with the acknowledge signal, followed by arbitrating the results of these two arbitrations, which results in a gating signal that enables further undisturbed propagation of the acknowledge signal down the arbitration tree. Both solutions use the same quantity of electronic components, or add buffers, and effectively allowing readout in the event of accumulated read request signals without dead-time. The buffers may be added to handle additional capacitive loads or to provide a desired active logic level, but the buffers may typically be considered as optional elements and may be added in a standard procedure of digital implementation with timing enclosure.

The arbitration cell type II does not exhibit any issues that can lead to errors in arbitrating between the channels. Nevertheless, arbitration cell type II may exhibit a dead time during readout, which can be measured as a skipped acknowledge time slot. This situation can occur when one of the arbitration cells, and consequently the entire arbitration tree, is blocked until the current token expires, rather than being able to accept new data to be transferred. This situation also occurs when there is a second request sent at the same time while there is an acknowledge token present in the cell that has been received due to an earlier request sent to the same cell. Such a blockage occurs because a request output is not gated by an acknowledge input in any way, and thus the acknowledge input can be activated even when the full arbitration process is not able to be conducted inside the arbiter. That is, the token remains in the arbitration cell because the next stage is informed that there is still a request from the preceding stage of the tree, but that token cannot be used or redirected from one acknowledge output to the second acknowledge output because the path to the second acknowledge output cannot be established, and as a result, there is no active grant signal. The same blocking phenomenon is observed in arbitration cell type III, which is based on an embodiment of arbiter type III shown in FIG. 19D.

The problem of arbitration tree blockage in arbitration cell type III is addressed by generating a request output as a logical sum of signals after the first process of arbitration, thereby using so-called "ferried requests" (freq0, freq1) wherein, if at least one of the ferried requests is active, then the request output is active. By using this technique, a token is not blocked in the arbitration cell and can be withdrawn from an arbitration cell even if the request was sent while the token was still active in the arbitration cell. This allows the token to be transferred to the other requesting channel without waiting for the token to expire. An embodiment of an arbiter type III that implements the above technique is shown in FIG. 19E.

The difference between the two versions, that is, type I versus type II or III of the arbitration cell, manifests in how high up the arbitration tree disconnection of the acknowledge path propagates when switching from servicing one channel to servicing another channel. This results in different orders of reading out the channels when the operation of the readout tree with the type I version of the generalized arbitration cell is compared with the operation of the readout tree with the type II or III version of the generalized arbitration cell. For the readout tree with the type I arbitration tree, the disconnection of the acknowledge path occurs up to the top cell even when two neighboring channels that send their read request signals to the arbitration cell, are to be read out (i.e., a domino effect). For the readout tree with type II/III of the arbitration cell, the acknowledge path is disconnected only up to the next level of the arbitration tree, where one of the two read request signals is active. In the case of two read request signals in the same arbitration cell, there is no disconnection of the acknowledge path that occurs for the case of the type II/III circuit.

Thus, the blocking phenomenon and method of resolving the blocking phenomenon render the arbitration cell type III, which includes the embodiment of the arbiter shown in FIG. 19E, a preferred arbitration method when the acknowledge path should only be disconnected from the nearest level of the arbitration tree.

Figure 25A:
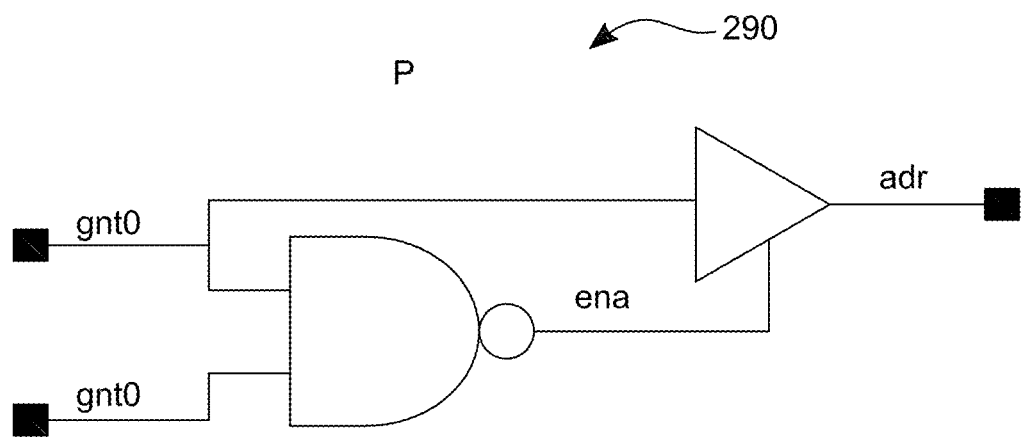
FIGS. 25A-B show embodiments of an address encoder implemented using tristate buffers.
Figure 25B:
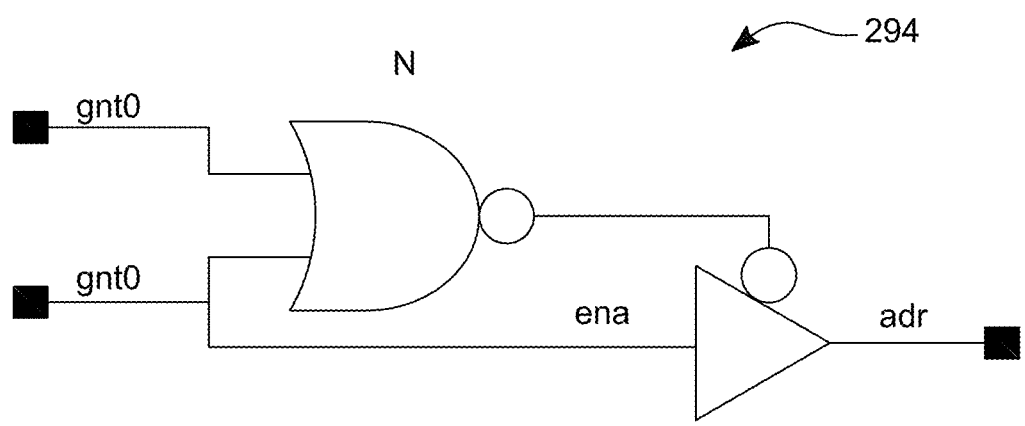
Figure 26A:
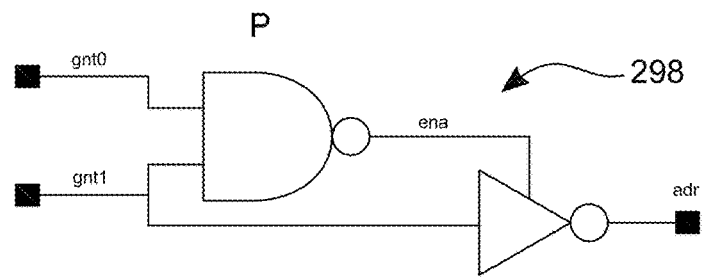
FIGS. 26A-B show embodiments of an address encoder implemented using tristate inverters.
Figure 26B:
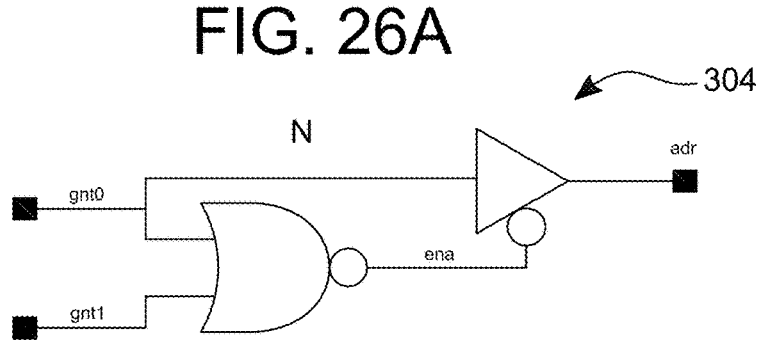

Another element used to implement the arbitration cell is the address encoder. The address encoder is implemented in two complementary embodiments 290, 294 shown in FIGS. 25A-B for use in different arbitration cell types. Alternatively, rather than tristate buffers, embodiments 298, 304 having tristate inverters can be used as shown in FIGS. 26A-B.

Figure 27:
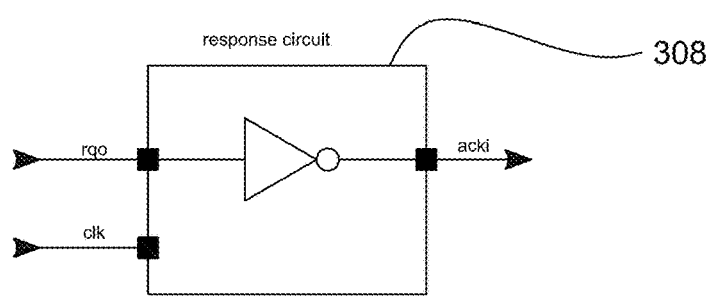
FIG. 27 shows an embodiment of a response circuit with asynchronous generation of acknowledge based on an output request state.
Figure 28:
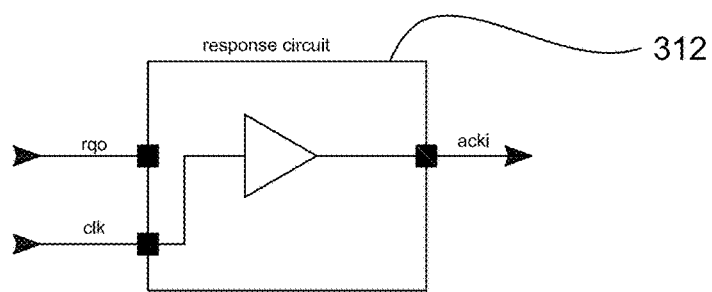
FIG. 28 shows an embodiment of a response circuit.

Abandonment of the priority encoder found in AERD and AER architectures in favor of the Seitz arbiter is advantageous in readout systems since doing so introduces asynchronous memory elements while eliminating glitches during arbitration and distribution of the acknowledge. An embodiment using the Seitz arbiter, which is asynchronous and generates acknowledge tokens based on requests is implemented in accordance with the disclosed embodiments using a response circuit 308, such as that shown in FIG. 27. However, this embodiment 308 is not able to generate multiple tokens that can be used by in-channel logic to provide multiple readout phases or initiate request resets. For these reasons, an embodiment of the response circuit 312 shown in FIG. 28 is used. In this embodiment 312, tokens are generated based on a clock, which is provided by an external acquisition system directly or derived from the external acquisition system using an on-chip clock management circuit. Since decisions regarding sending in of tokens are not made based on requests, but rather tokens are generated as time windows expire synchronously, time frames for a readout are also precisely defined.

Figure 29:
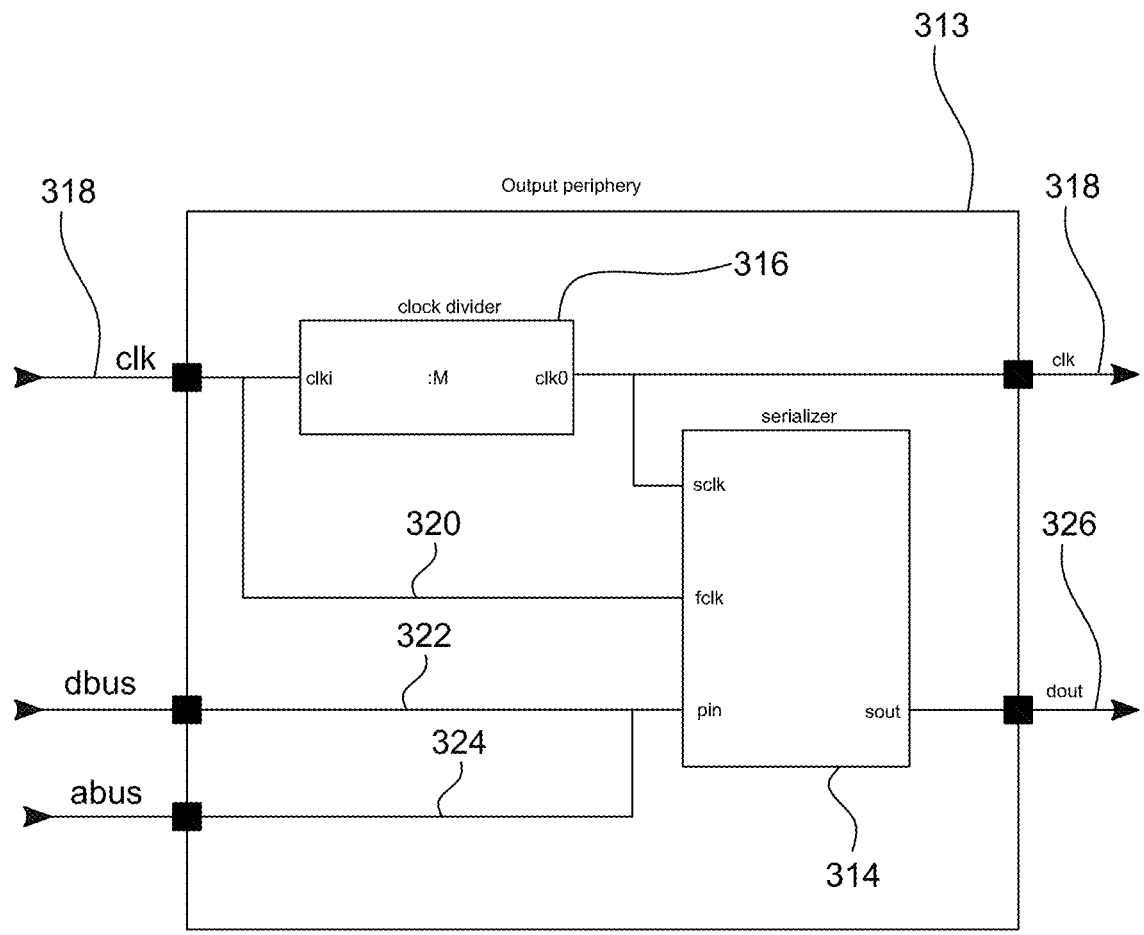
FIG. 29 shows an embodiment of an output periphery.

FIG. 29 shows an embodiment of an output periphery block 313 that includes a system serializer 314 and clock divider 316. An external clock 318 is fed to the clock divider 316 and divided by a factor of M. The original clock 318 and divided clock 320 are fed to the serializer 314 as a fast (fclk) 320 and slow (sclk) clock 318, respectively. The slow clock 318 is used to latch the parallel on-chip data bus 322 and/or analog bus 324 (pin) and the fast clock 320 is used to transfer that data in series using a serial output (sout). The slow clock 318 is also fed to the response circuit as a source of tokens. This relationship (i.e., using the same source clock to latch data and activate/deactivate in-channel readout) synchronizes the readout process and eliminates potential metastability issues. The quantity of serial output lines that are present and/or used is not limited and additional serial output lines can be used in parallel to transmit more data at the same time. In general, the quantity of bits latched in serializer during a readout cycle from the channel is equal to the product of a serialization factor and a quantity of outputs.

Figure 30:
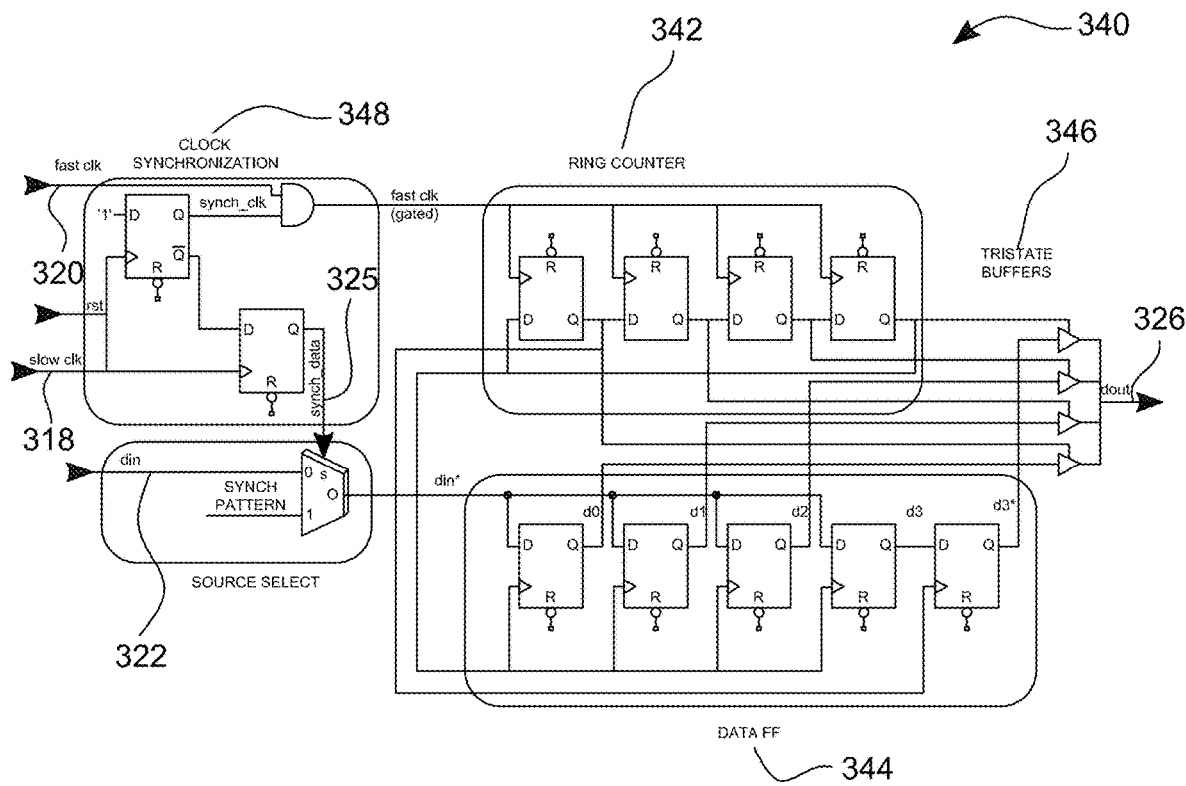
FIG. 30 shows a first embodiment of a serializer.

An embodiment of the serializer 340 is shown in FIG. 30, in which a quantity of flip-flops in a ring counter block 342 and data FF block 344, and buffers in a tristate buffer block 346 depend on the quantity of data lines. In general, both of these numbers are equal unless additional functionality is implemented, such as a serial-parallel transmission of data. A clock synchronization block 348 synchronizes edges of the fast clock 320 and slow clock 318 and initiates the serialization process. A source select block is used to send synchronization patterns to the external acquisition system following reset. This operation is used to define the first bit of data frame in an output bitstream. The ring counter 342 stores an actual position of a bit to be transmitted. This position is stored as a vector with one active bit at given time. The ring counter 342 is initialized using the set(S)/reset(R) pins of flip-flops included in the ring counter 342. The data FF block 344 includes a set of flip-flops that are used to latch values from the data bus 322. The tristate buffers 346 drive serial output lines using bit values corresponding to a position pointed to by the ring counter 342.

Figure 31:
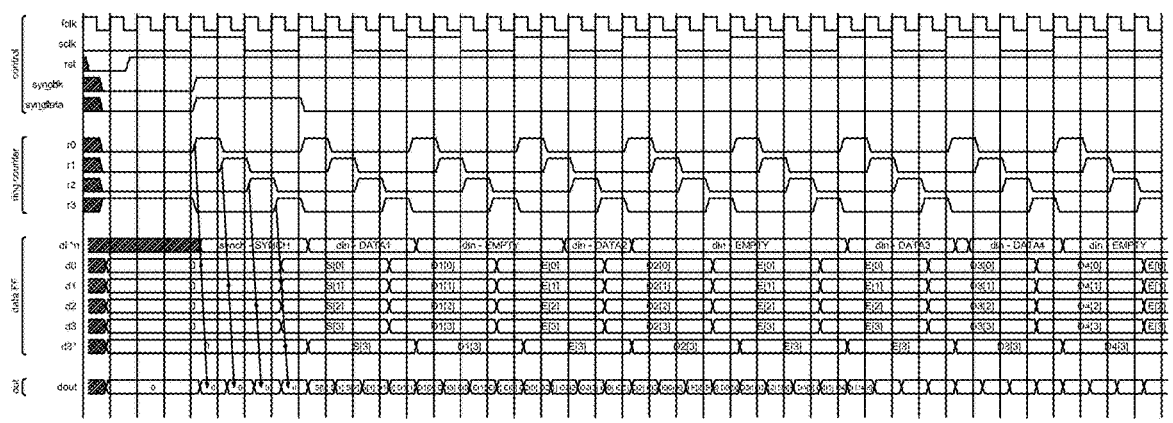
FIG. 31 shows a timing diagram of waveforms illustrating operation of the first embodiment of the serializer shown in FIG. 30.

The waveforms shown in FIG. 31 illustrate operations performed by the serializer. These waveforms illustrate serializer operation cycles following reset (low level on the rst line) as well as cause-effect dependencies between individual signals. Data appearing on the din* bus, is provided for example only and, in fact, depends on the activity of the channels. The outputting of the "synch—SYNCH" value is forced by an active state of the synch_data signal 325. Data from the data bus 322 is latched between the falling edge of the slow clock 318, which corresponds to the token expiration and the last moment before the readout phase is triggered, and the next rising edge, which corresponds to the end of the readout phase or communication with a channel and the beginning of a new readout phase, if needed. An additional quantity of flip-flops, located at the end of the set of flip-flops, which use a different trigger source, may be used to ensure that data is stable when a selected buffer is enabled.

When there is no active readout from any channel performed, the state of the data bus is set by a pull-up/pull-down network. As a result, this state, which is referred to as the "default" or "empty" state, is latched in the serializer.

Figure 32:
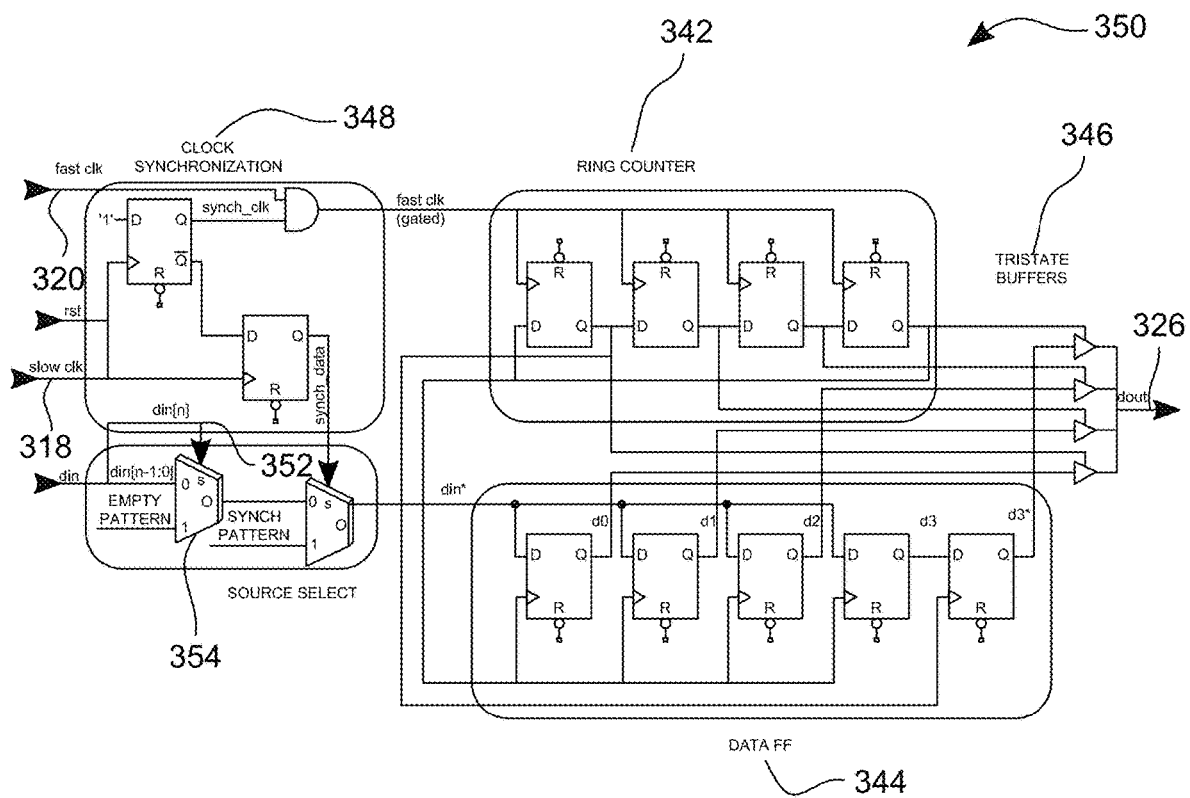
FIG. 32 show a second embodiment of the serializer in which pull-up/pull-down networks are not used on data signals and settling time is maximized.

To save power required to override the default state of the data bus during readout, another alternative approach is introduced. Rather than using a pull-up/pull-down network on all lines included in the data bus, an additional signal 352 and multiplexer 354 are added, as shown in the modified embodiment 350 of FIG. 32. This additional signal 352 is used to indicate that a readout from a channel is being performed. A pull-up resistor (not shown) on the additional signal 352 is used and a high state is overridden during readout by a buffer inside a corresponding channel. Based on the state of this additional signal 152, the multiplexer 354 selects the source of data to be processed. This can be either a fixed value that represents empty data or data on the data bus driven by buffers inside one of the channels, from which the readout is being performed.

Figure 33:
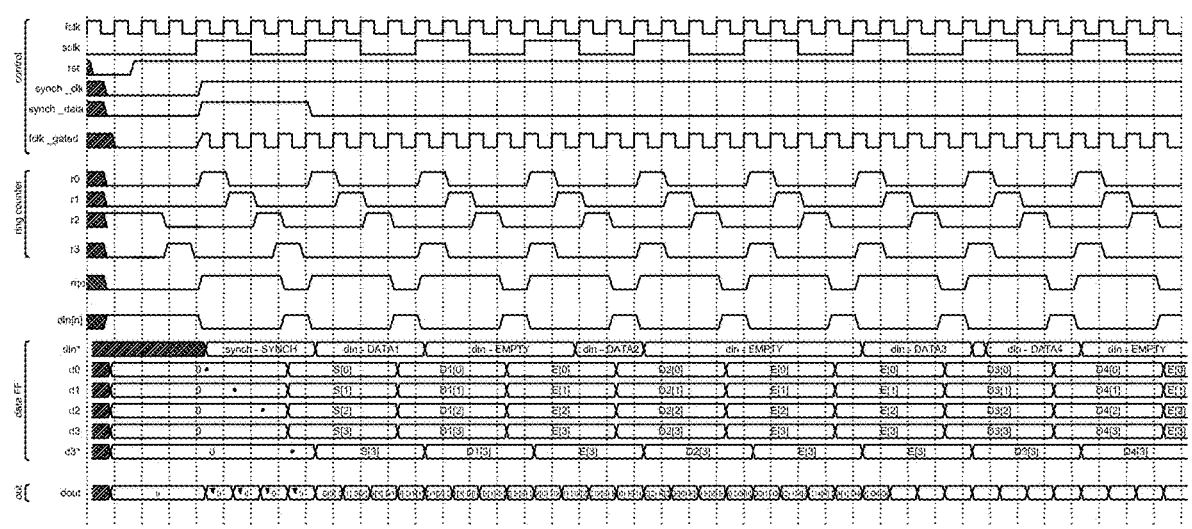
FIG. 33 shows a timing diagram of waveforms illustrating operation of the second embodiment of the serializer shown in FIG. 32.

There is one additional difference between embodiment 350 and embodiment 340. In the embodiment 340, the data settling time on the data bus is not maximized because the data latching is performed at least one fast clock cycle before the rising edge of the slow clock, and the slow clock is responsible for generating the acknowledge tokens. In contrast, in embodiment 350, the settling time is maximized because the rising edge of slow clock is latching data directly. As a result, a different initialization pattern, which includes the reset and set inputs, for the ring counter 342 is used to ensure that bits are transmitted in the correct order, that is, from the least significant bit to the most significant bit. In general, latching may even occur after the slow clock edge, if that data has not changed The waveforms shown in FIG. 33 illustrate operation of the serializer in embodiment 350. The waveform of the additional selector din[n] 352, for example, depends on activity of the channels. The waveform of the rqo signal from the arbitration tree corresponding to the signal din[n] 154 is also shown.

Figure 34:
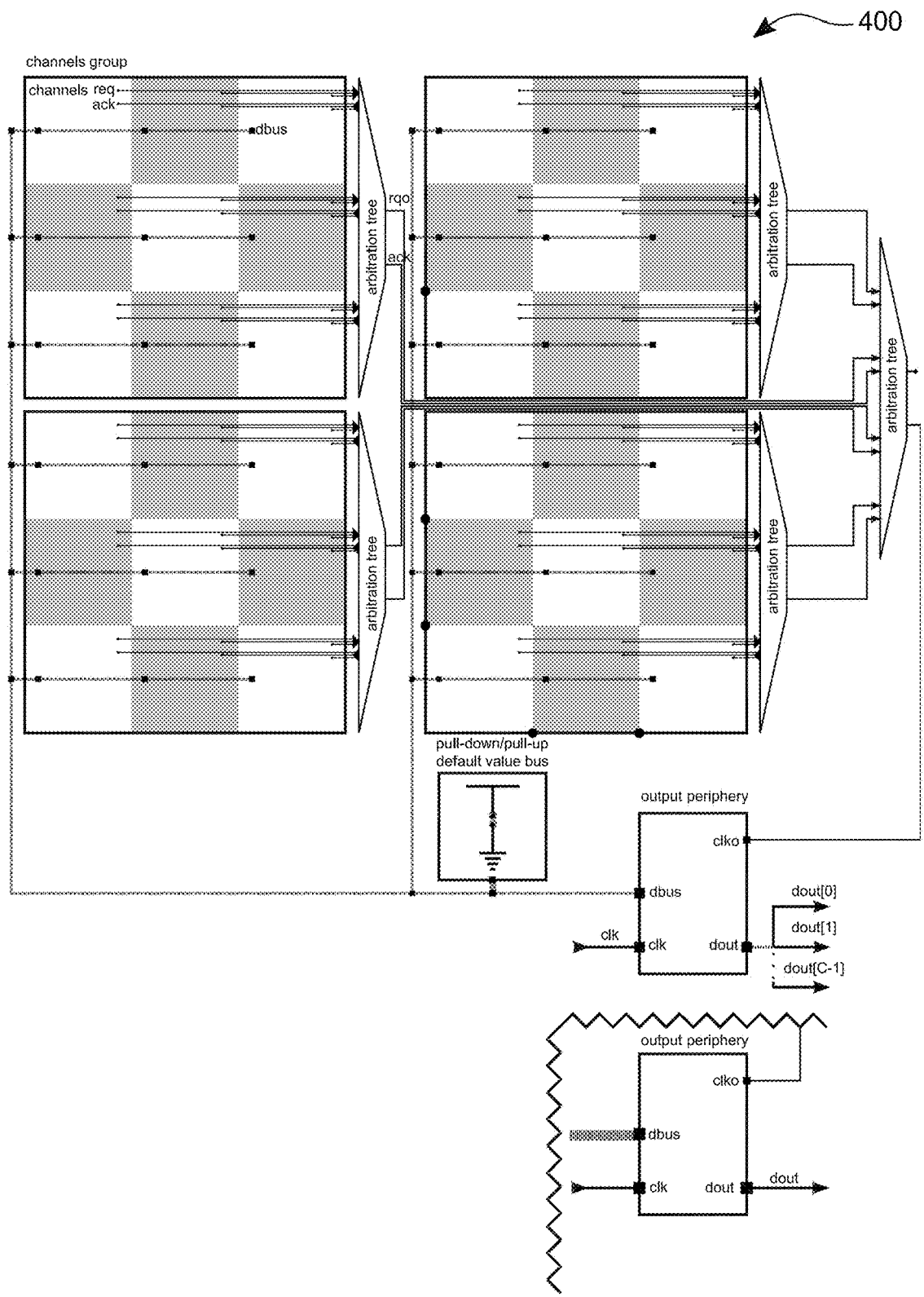
FIG. 34 shows an embodiment including grouped channels and a spatially distributed arbitration tree.

In a chip or system, the arbitration tree is spatially distributed according to the channel configuration, which can be grouped, for example, into columns or smaller arrays. Such an embodiment 400 is shown in FIG. 34. One or more outputs, which are used to transfer data to the outside of the chip, are used depending on a serialization factor, data bus width, and/or a quantity of readout phases. Since the quantity of readout phases may be dynamically reconfigured, some outputs can be physically present, yet remain unused in a given configuration. For example, a single output mode with multiple readout phases or a single-phase mode readout with multiple outputs can be implemented and configured.

Figure 35:
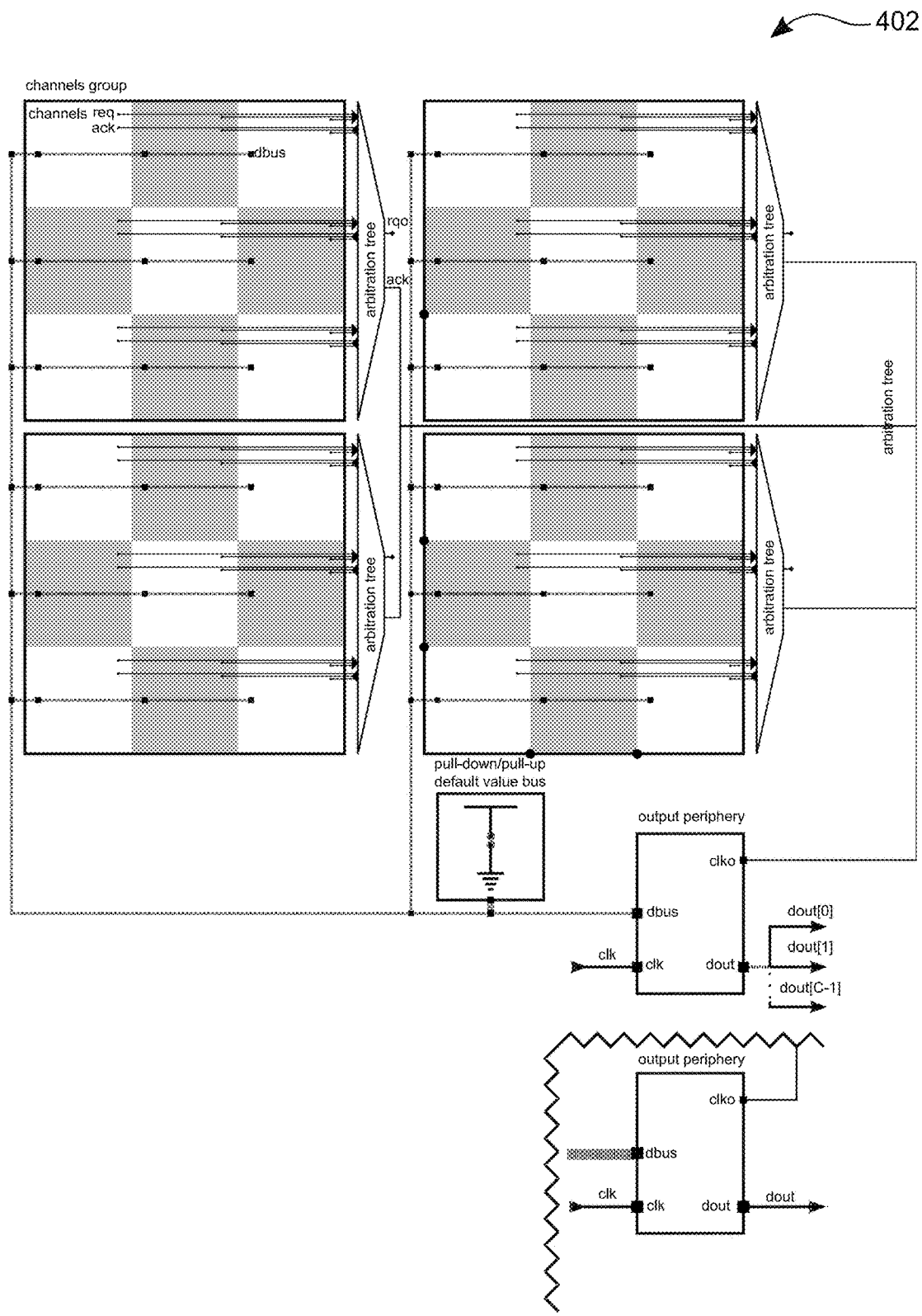
FIG. 35 shows an embodiment including grouped channels including independent data busses and arbitrations trees.

Managing a chip and/or system that includes larger quantities of channels may require additional considerations. Buffers connected to a shared line add extra capacitance to that shared line. This capacitance is primarily added in the form of buffer output capacitance, but also includes the capacitance of additional wire connections. If the overall capacitance is too large, data may be not able to fully settle in the required time on the data bus, which may result in timing violations and data corruption. Increasing the buffer strength on channels can be a solution, but this not only consumes additional area and power, but also presents limitations, such as larger buffers having larger output capacitance. Another approach includes dividing channels into groups, each having a dedicated data bus. However, this consumes a larger routing area, and thus may be appropriate for systems having narrower busses. Another advantage of this technique is higher data rates, as each data bus can be treated as an independent link so that multiple channels can be read out in parallel during the same time interval. In this case the entire system can have multiple outputs (i.e., one or more for each group) or a high-speed output with time division multiplexing. Such an embodiment 402 is shown in FIG. 35.

Figure 36:
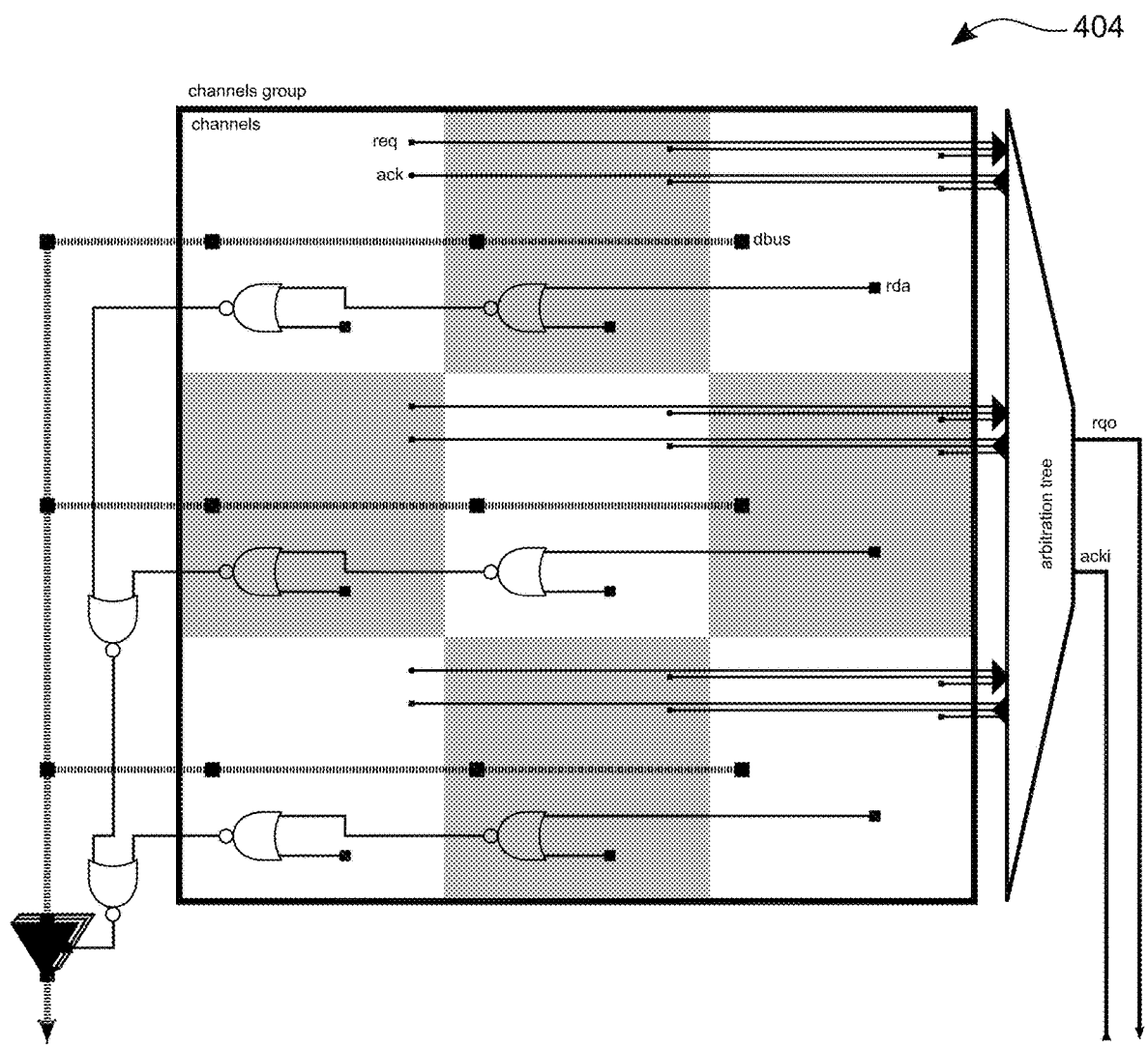
FIG. 36 shows an embodiment including an additional buffering stage on the data bus.

In general, a combination of both techniques can be implemented in a system by creating a group hierarchy. Downstream groups can share a single data bus and be bundled in a higher upstream group, in which different groups have their own dedicated data bus. It can also be substantially advantageous to introduce additional stages of buffering in each group. These buffers are preferably tristate buffers activated by a logical sum of buffer enable signals associated with a lower hierarchical priority. Such an embodiment 404 is shown in FIG. 36.

The disclosed embodiments include well-specified yet flexible architectures. There is no restriction on data types that are transferred during the readout phase. One of the most useful techniques using the disclosed embodiments is sending information from adjacent cells regarding a shared event, such as a particle hit on a sensor and its associated charge sharing effect.

It is to be noted that embodiments disclosed herein may be implemented using MOSFETs or bipolar transistors while remaining within the scope of the intended disclosure.

Figure 37:
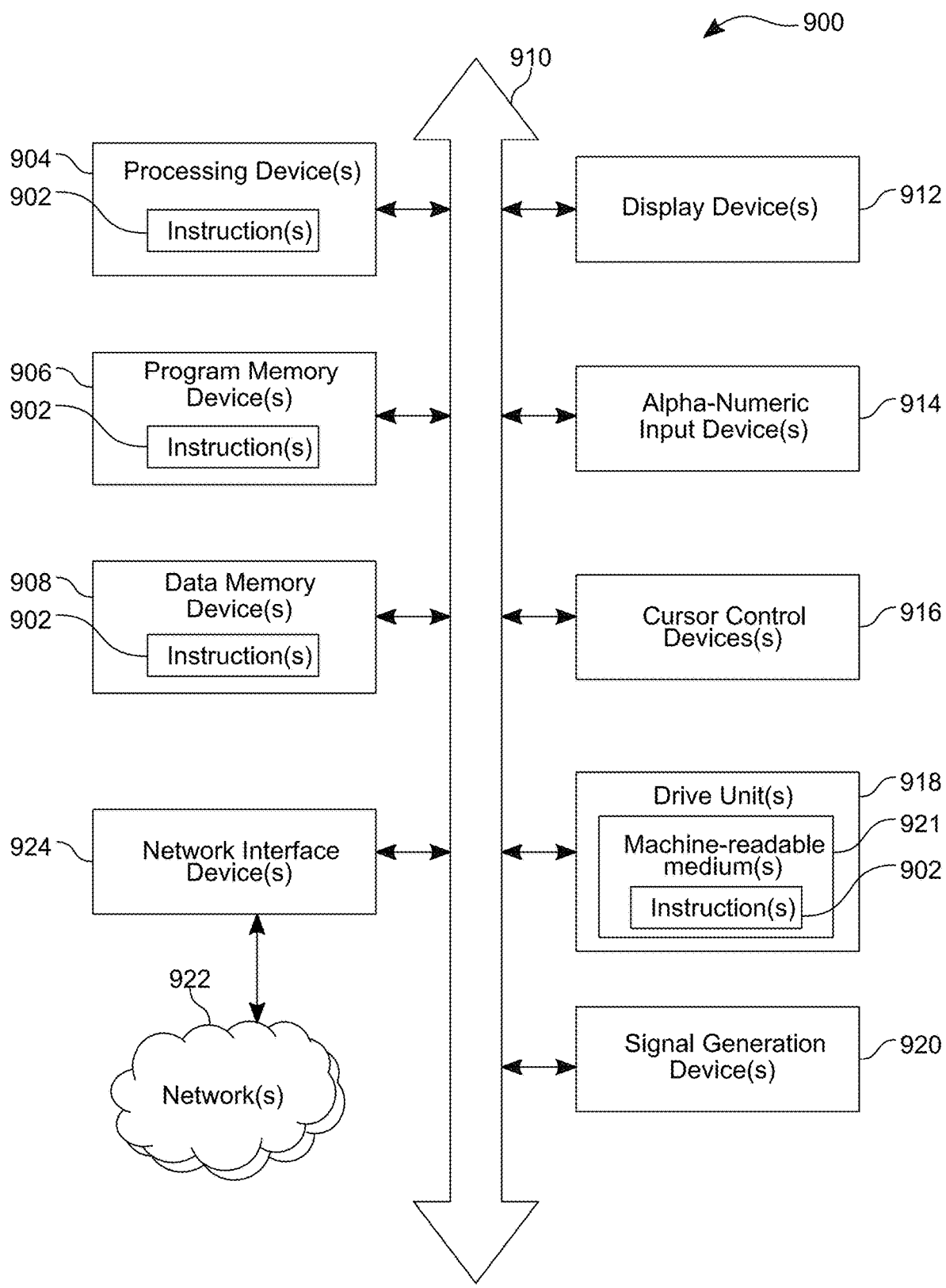
FIG. 37 shows a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 37 is a block diagram of an embodiment of a machine in the form of a computing system 900, within which is a set of instructions 902 that, when executed, cause the machine to perform any one or more of the methodologies according to embodiments of the invention. In one or more embodiments, the machine operates as a standalone device; in one or more other embodiments, the machine is connected (e.g., via a network 922) to other machines. In a networked implementation, the machine operates in the capacity of a server or a client user machine in a server-client user network environment. Exemplary implementations of the machine as contemplated by embodiments of the invention include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 900 includes a processing device (s) 904 (e.g., a central processing unit (CPU), a graphics processing unit (GPU), or both), program memory device(s) 906, and data memory device(s) 908, which communicate with each other via a bus 910. The computing system 900 further includes display device(s) 912 (e.g., liquid crystal display (LCD), flat panel, solid state display, or cathode ray tube (CRT)). The computing system 900 includes input device(s) 914 (e.g., a keyboard), cursor control device(s) 916 (e.g., a mouse), disk drive unit(s) 918, signal generation device(s) 920 (e.g., a speaker or remote control), and network interface device(s) 924, operatively coupled together, and/or with other functional blocks, via bus 910.

The disk drive unit(s) 918 includes machine-readable medium(s) 926, on which is stored one or more sets of instructions 902 (e.g., software) embodying any one or more of the methodologies or functions herein, including those methods illustrated herein. The instructions 902 may also reside, completely or at least partially, within the program memory device(s) 906, the data memory device(s) 908, and/or the processing device(s) 904 during execution thereof by the computing system 900. The program memory device (s) 906 and the processing device(s) 904 also constitute machine-readable media. Dedicated hardware implementations such as, but not limited to, ASICs, programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term "processing device" as used herein is intended to include any processor, such as, for example, one that includes a CPU (central processing unit) and/or other forms of processing circuitry. Further, the term "processing device" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 912, input device (s) 914, cursor control device(s) 916, signal generation device(s) 920, etc., can be collectively referred to as an "input/output interface," and is intended to include one or more mechanisms for inputting data to the processing device (s) 904, and one or more mechanisms for providing results associated with the processing device(s). Input/output or I/O devices (including, but not limited to, keyboards (e.g., alpha-numeric input device(s) 914, display device(s) 912, and the like) can be coupled to the system either directly (such as via bus 910) or through intervening input/output controllers (omitted for clarity).

In an integrated circuit implementation of one or more embodiments, multiple identical dies are typically fabricated in a repeated pattern on a surface of a semiconductor wafer. Each such die may include a device described herein and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of this invention.

In accordance with various embodiments, the methods, functions, or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium including instructions 902, or that which receives and executes instructions 902 from a propagated signal so that a device connected to a network environment 922 can send or receive voice, video, or data, and to communicate over the network 922 using the instructions 902. The instructions 902 are further transmitted or received over the network 922 via the network interface device(s) 924. The machine-readable medium also contains a data structure for storing data useful in providing a functional relationship between the data and a machine or computer in an illustrative embodiment of the systems and methods herein.

While the machine-readable medium 902 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiments are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

What is claimed is:

1. An event-driven readout management system comprising non-priority access arbitration of a plurality of channels, the system comprising:

an arbitration tree circuit, the arbitration tree circuit determining to which of the plurality of channels to grant access to a common signal transfer resource shared by the plurality of channels, the determination being based on a readout access request provided by at least one of the plurality of channels, the arbitration tree circuit excluding simultaneous occurrence of multiple readout access requests from the determination, the readout access request being received by the arbitration tree circuit and stored in the arbitration tree circuit until access is granted to the common signal transfer resource by the arbitration tree circuit, the arbitration tree circuit terminating a prior readout transaction and commencing a subsequent readout transaction in response to a single edge of a clock signal;

a response circuit, the response circuit operatively coupled to the arbitration tree circuit, a state of the clock signal representing an acknowledge token, the acknowledge token being provided to the arbitration tree circuit, the arbitration tree circuit using the acknowledge token to grant access to the common signal transfer resource;

an in-channel logic circuit, the in-channel logic circuit operatively coupled to the arbitration tree circuit, the in-channel logic circuit generating the readout access request and receiving the acknowledge token, the in-channel logic circuit terminating the prior readout transaction and commencing the subsequent readout transaction in response to receiving the acknowledge token; and an output periphery circuit, the output periphery circuit converting information received from the plurality of channels into an output format on the common signal transfer resource.

2. The system, as defined by claim 1, wherein the common signal transfer resource comprises at least one of an analog signal transfer line, a digital signal transfer line.

3. The system, as defined by claim 1, wherein the readout access request is generated in response to an event, the event comprising activation of at least one of the plurality of channels to generate transferrable data.

4. The system, as defined by claim 1, wherein the readout transaction comprises a plurality of readout phases, at least one of the plurality of readout phases causing transfer of at least a portion of information from one of the plurality of channels to the common signal transfer resource.

5. The system, as defined by claim 1, wherein a duty cycle associated with the clock signal is selectable to define an acceptance time associated with the readout access request and to assure settling time associated with the common signal transfer resource.

6. The system, as defined by claim 1, wherein the determination further comprises determining, with a plurality of readout phases associated with the readout transaction, which channel of the plurality of channels is granted access to the common signal transfer resource independent of at least one of readout access requests stored in the arbitration tree circuit, readout access requests received, a relative position of the plurality of channels with respect to the arbitration tree circuit.

7. The system, as defined by claim 1, wherein a quantity of edges associated with the clock signal is equal to a quantity of readout phases associated with the readout transaction from one channel.

8. The system, as defined by claim 1, wherein the arbitration tree circuit operates asynchronously with the plurality of channels.

9. The system, as defined by claim 1, wherein the arbitration tree circuit operates synchronously with the output periphery circuit.

10. The system, as defined by claim 1, wherein the arbitration tree circuit operates synchronously with the in-channel logic circuit, the in-channel logic circuit operating asynchronously in generating the read access request, the duration of the acknowledge token defining an acceptance time window associated with the read access request for outputting data from at least one of the plurality of channels.

11. The system, as defined by claim 1, wherein a duty cycle of the acknowledge token signal is selectable to provide data settling time after granting access to the common signal transfer resource.

12. The system, as defined by claim 1, wherein the plurality of channels provides information to the common signal transfer resource such that a transmission order associated with concurrently requesting channels is independent of positions associated with the concurrently requesting channels within the arbitration tree circuit.

13. The system, as defined by claim 1, wherein the clock signal comprises a first state and a second state, the first state being defined as active and comprising an acknowledge token that enables new read access requests to be accepted, the second state disabling acceptance of a new read access request to avoid starting data transmission with insufficient data settling time after access is granted to the common signal transfer resource in response to acceptance of the new read access request if the acknowledge token is to be routed to a new channel.

14. The system, as defined by claim 1, wherein the readout access requests processed by the arbitration tree circuit comprise logical sums of readout access requests associated with at least one lower stage in the arbitration tree circuit.

15. The system, as defined by claim 1, wherein the readout access requests processed by the arbitration tree circuit comprise logical sums of result signals from arbitration between readout access requests.

16. The system, as defined by claim 1, wherein the readout access requests processed by the arbitration tree circuit comprise logical sums of result signals from arbitration between results of arbitration between readout access requests, entering arbitration cells, and the clock signal comprising acknowledge tokens in the arbitration cells.

17. The system, as defined by claim 1, wherein the readout access requests processed by the arbitration tree circuit comprise logical sums of result signals from arbitration between readout access requests, entering arbitration cells, and the clock signal comprising acknowledge tokens in the arbitration cells.

18. A method of non-priority arbitration of a plurality of channels using an event-driven readout management system, the method comprising:
  determining, using an arbitration tree circuit, to which of the plurality of channels to grant access to a common signal transfer resource shared by the plurality of channels, the determination based on a readout access request provided by at least one of the plurality of channels;
  excluding, using the arbitration tree circuit, simultaneous occurrence of multiple readout access requests from the determination;
  receiving and storing the readout access requests in the arbitration tree circuit until access is granted to the common signal transfer resource by the arbitration tree circuit;
  terminating, using the arbitration tree circuit, a prior readout transaction and commencing a subsequent readout transaction in response to a single edge of a clock signal;
  providing an acknowledge token to the arbitration tree circuit, the arbitration tree circuit using the acknowledge token to grant access to the common signal transfer resource, a state of the clock signal representing the acknowledge token;
  generating, using an in-channel logic circuit, the readout access request and receiving the acknowledge token, the in-channel logic circuit operatively coupled to the arbitration tree circuit;
  terminating, using the in-channel logic circuit, the prior readout transaction and commencing the subsequent readout transaction in response to receiving the acknowledge token; and
  converting, using an output periphery circuit, information received from the plurality of channels into an output format on the common signal transfer resource.

19. A non-transitory computer-readable medium comprising instructions that, when executed by a processing device, perform operations comprising:
  determining, using an arbitration tree circuit, to which of the plurality of channels to grant access to a common signal transfer resource shared by the plurality of channels, the determination based on a readout access request provided by at least one of the plurality of channels;
  excluding, using the arbitration tree circuit, simultaneous occurrence of multiple readout access requests from the determination;
  receiving and storing the readout access requests in the arbitration tree circuit until access is granted to the common signal transfer resource by the arbitration tree circuit;
  terminating, using the arbitration tree circuit, a prior readout transaction and commencing a subsequent readout transaction in response to a single edge of a clock signal;
  providing an acknowledge token to the arbitration tree circuit, the arbitration tree circuit using the acknowledge token to grant access to the common signal transfer resource, a state of the clock signal representing the acknowledge token;
  generating, using an in-channel logic circuit, the readout access request and receiving the acknowledge token, the in-channel logic circuit operatively coupled to the arbitration tree circuit;
  terminating, using the in-channel logic circuit, the prior readout transaction and commencing the subsequent readout transaction in response to receiving the acknowledge token; and
  converting, using an output periphery circuit, information received from the plurality of channels into an output format on the common signal transfer resource.

* * * * *